(12) United States Patent
Kazui et al.

(10) Patent No.: US 8,977,833 B2
(45) Date of Patent: Mar. 10, 2015

(54) MEMORY SYSTEM

(75) Inventors: Takashi Kazui, Kanagawa (JP); Norikazu Yoshida, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 383 days.

(21) Appl. No.: 13/451,750

(22) Filed: Apr. 20, 2012

(65) Prior Publication Data

US 2012/0278664 A1 Nov. 1, 2012

(30) Foreign Application Priority Data

Apr. 28, 2011 (JP) ................................. 2011-102496

(51) Int. Cl.
| | | |
|---|---|---|
| G06F 12/00 | (2006.01) | |
| G06F 13/00 | (2006.01) | |
| G06F 13/28 | (2006.01) | |
| G06F 12/02 | (2006.01) | |
| G06F 11/10 | (2006.01) | |
| G06F 3/06 | (2006.01) | |

(52) U.S. Cl.
CPC ........ G06F 12/0246 (2013.01); G06F 11/1012 (2013.01); G06F 3/061 (2013.01); G06F 3/0659 (2013.01); G06F 3/0688 (2013.01); G06F 2212/7203 (2013.01)
USPC ............................ 711/169; 711/103; 711/158

(58) Field of Classification Search
CPC .. G06F 3/0656; G06F 3/0688; G06F 13/1642
USPC ......................................... 711/103, 158, 169
See application file for complete search history.

(56) References Cited

U.S. PATENT DOCUMENTS

| | | | | |
|---|---|---|---|---|
| 2003/0236946 | A1* | 12/2003 | Greubel | 711/118 |
| 2008/0148010 | A1* | 6/2008 | Kodama | 712/16 |
| 2009/0024808 | A1* | 1/2009 | Hillier et al. | 711/155 |
| 2009/0113121 | A1* | 4/2009 | Lee et al. | 711/103 |
| 2010/0082879 | A1 | 4/2010 | McKean et al. | |
| 2012/0066435 | A1* | 3/2012 | Colgrove et al. | 711/103 |

FOREIGN PATENT DOCUMENTS

| | | |
|---|---|---|
| JP | 2001-154913 | 6/2001 |
| JP | 2007-26366 | 2/2007 |
| JP | 2010-128604 | 6/2010 |
| JP | 2010-282422 | 12/2010 |
| JP | 2011-505032 | 2/2011 |
| WO | WO 2009/064793 A1 | 5/2009 |

* cited by examiner

*Primary Examiner* — Ryan Bertram
(74) *Attorney, Agent, or Firm* — Oblon, McClelland, Maier & Neustadt, L.L.P.

(57) ABSTRACT

According to one embodiment, a memory system has a data transfer device which includes a first command generating unit, a second command generating unit, a first storage unit, a second storage unit, and a nonvolatile memory managing unit. The first command generator generates a first command for reading out data from a nonvolatile memory to a host apparatus. The second command generator generates a second command for internal processing of the memory system associated with a temporary memory and the nonvolatile memory. The first memory has a queue structure configured to store the first command. The second memory has a queue structure configured to store the second command. The memory manager is configured to read out the first command stored in the first memory in priority to the second command stored in the second memory and to transmit read-out command to the nonvolatile memory.

16 Claims, 21 Drawing Sheets

| COMMAND FIELD | CONTINUOUS INPUT INSTRUCTION FLAG |
|---|---|

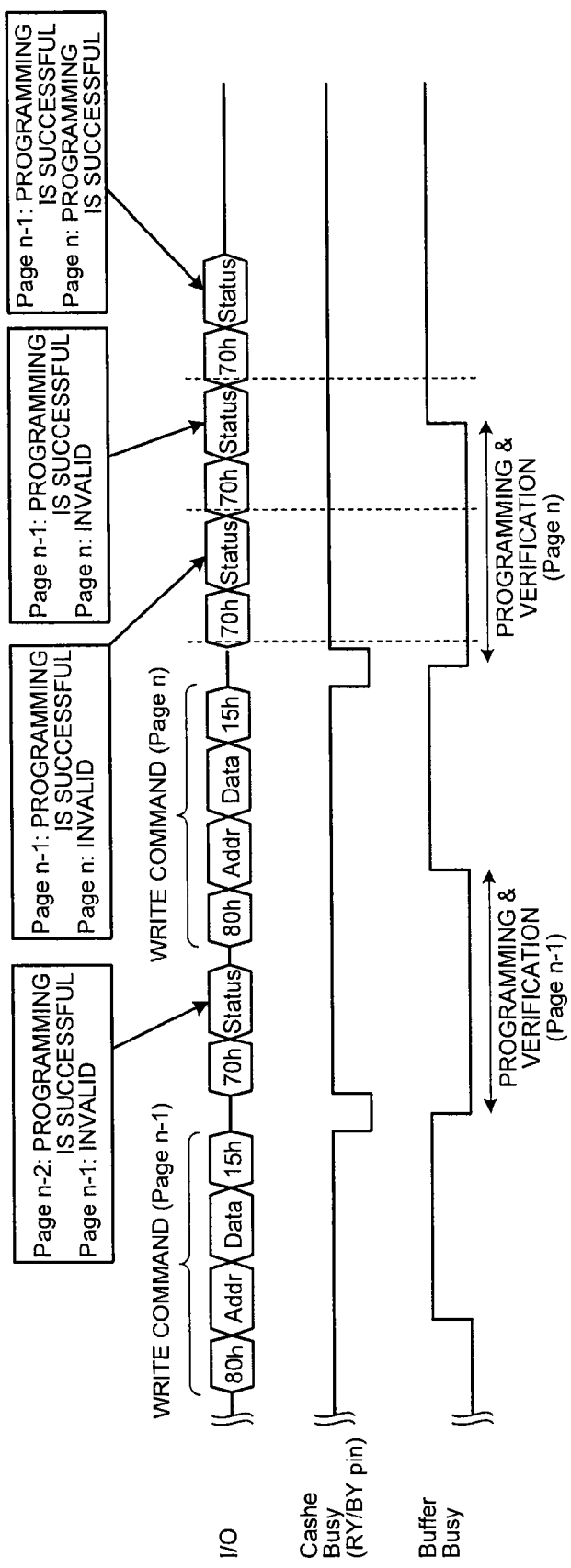

FIG.5

| COMMAND FIELD | CONTINUOUS INPUT INSTRUCTION FLAG |
|---|---|

FIG.6

| | |
|---|---|
| FFh | 0 |
| 80h-Addr-Data-15h (Page1) | 0 |
| 80h-Addr-Data-15h (Page2) | 1 |
| 70h-Status (STATUS READ) | 0 |
| 80h-Addr-Data-15h (Page3) | 1 |
| 70h-Status (STATUS READ) | 0 |
| ⋮ | ⋮ |
| 80h-Addr-Data-15h (Page n-1) | 1 |
| 70h-Status (STATUS READ) | 0 |
| 80h-Addr-Data-15h (Page n) | 1 |
| 70h-Status (STATUS READ) | 0 |
| 70h (STATUS POLLING) | 0 |

FIG.7

| 70h-Status (STATUS READ) | 0 |
|---|---|

FIG.8

| 70h-Status (STATUS POLLING) | 0 |
|---|---|

FIG.9

| TOP ADDRESS | NUMBER OF ENTRIES | POST-PROCESSING FLAG |
|---|---|---|

FIG.10

| TOP ADDRESS | NUMBER OF ENTRIES |
|---|---|

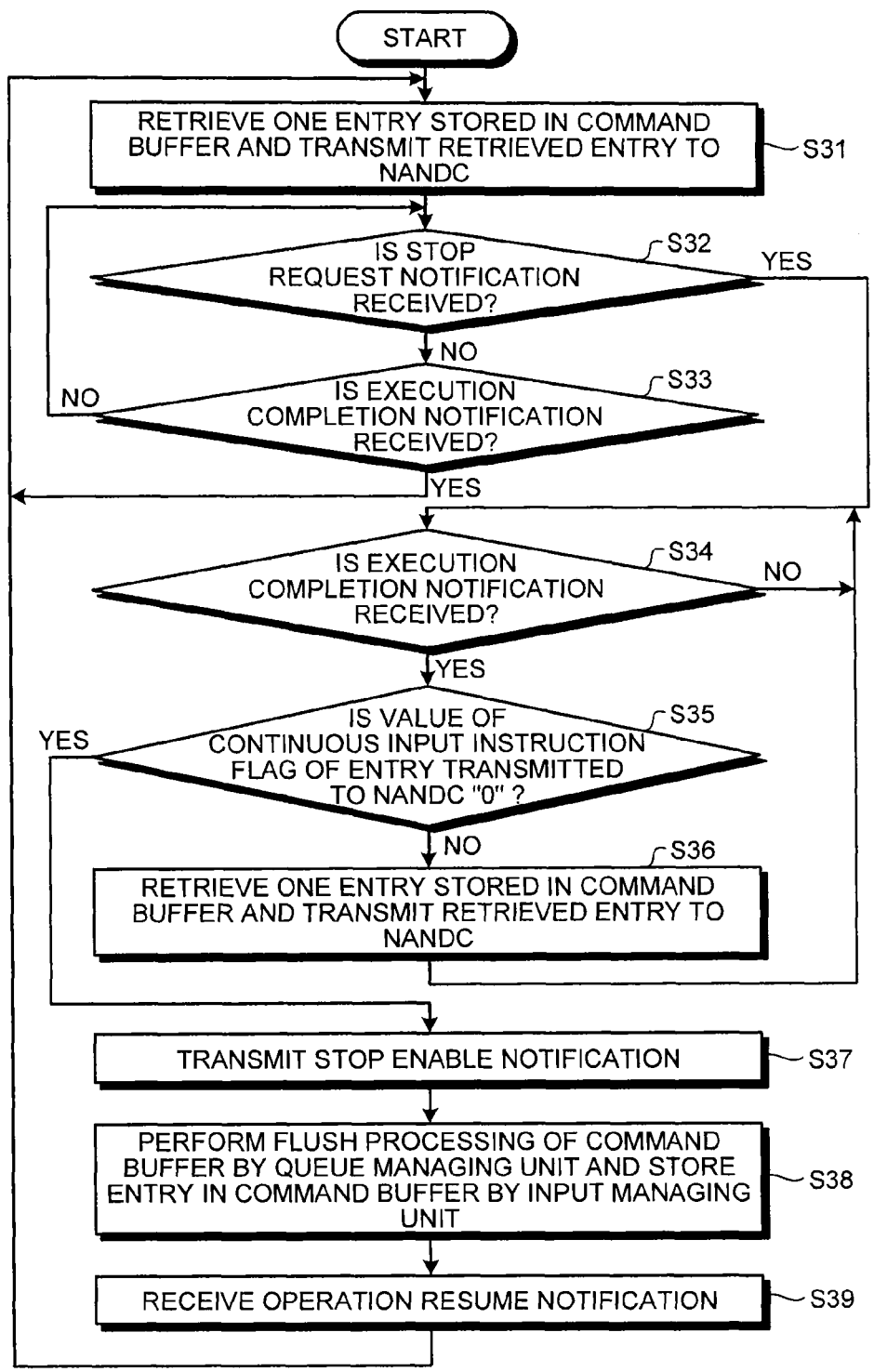

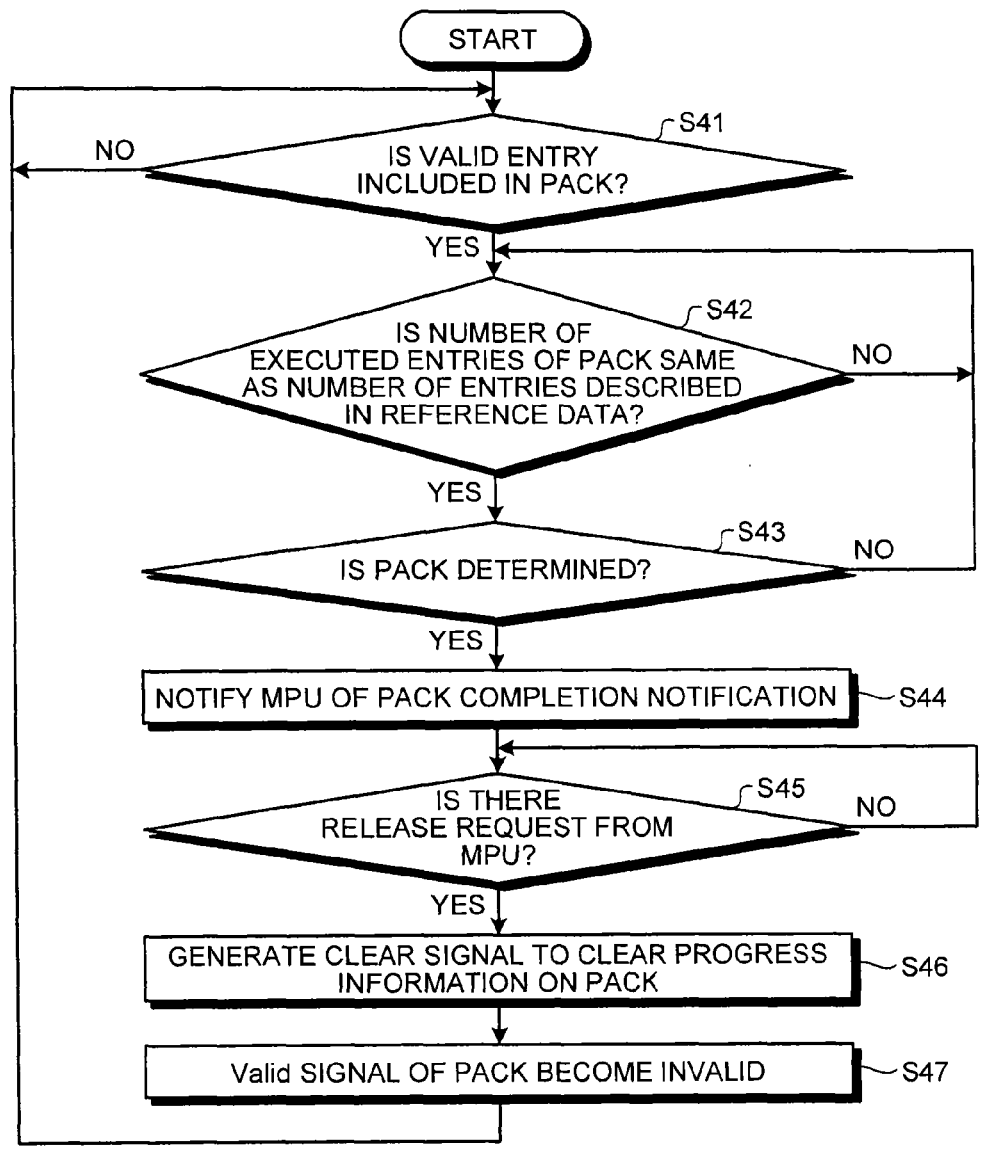

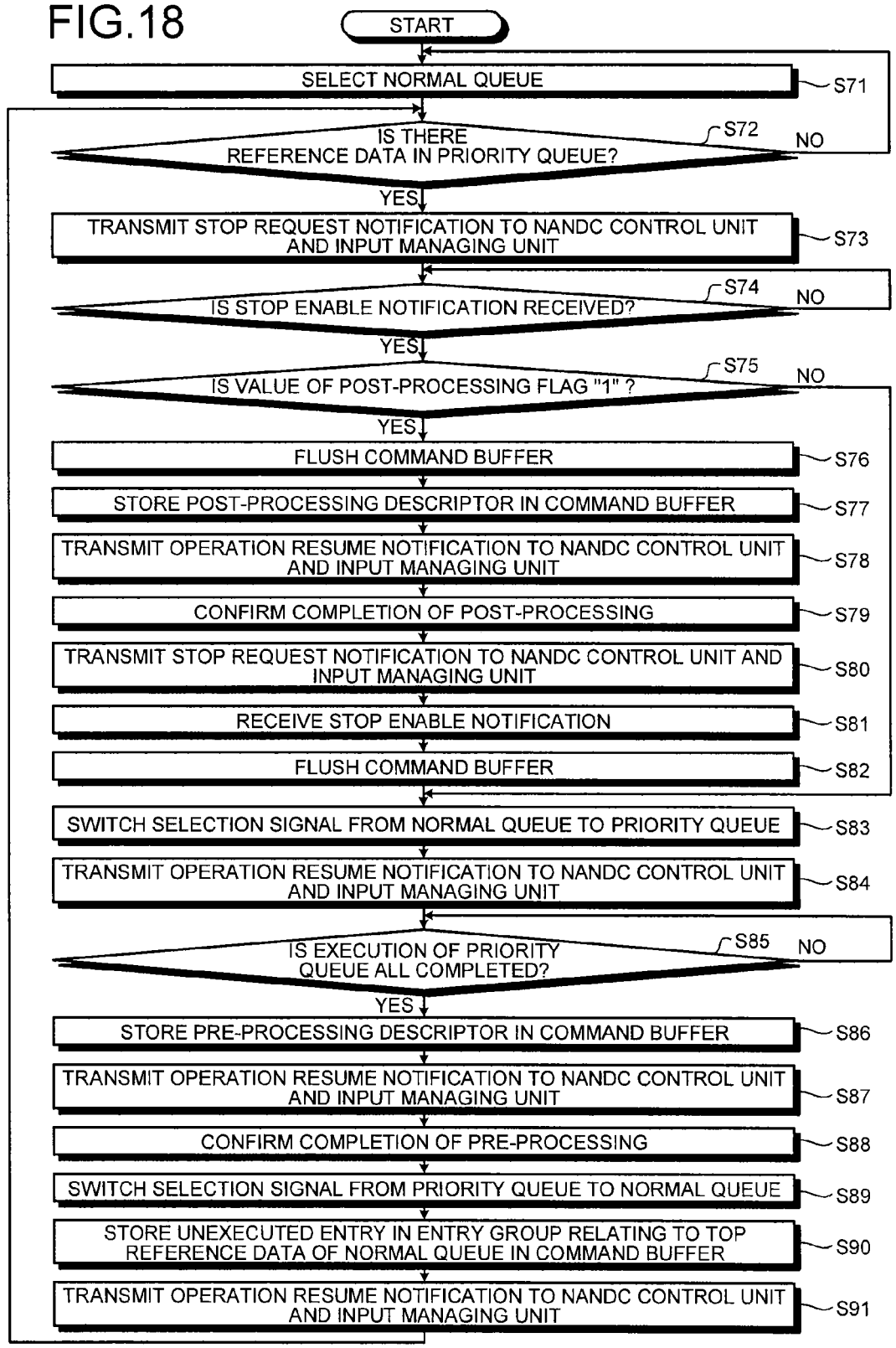

FIG.19

| | |
|---|---|
| FFh | 1 |
| 80h-Addr-Data-11h (PLANE 0, page1) | 1 |
| 80h-Addr-Data-15h (PLANE 1, page1) | 1 |
| 71h-Status (STATUS READ) | 0 |
| 80h-Addr-Data-11h (PLANE 0, page2) | 1 |
| 80h-Addr-Data-15h (PLANE 1, page2) | 1 |
| 71h-Status (STATUS READ) | 0 |
| 71h-Status (STATUS POLLING) | 0 |

FIG.20

| | |
|---|---|
| 71h-Status (STATUS POLLING) | 0 |

MEMORY SYSTEM

CROSS-REFERENCE TO RELATED APPLICATIONS

This application is based upon and claims the benefit of priority from Japanese Patent Application No. 2011-102496, filed on Apr. 28, 2011; the entire contents of which are incorporated herein by reference.

FIELD

Embodiments described herein relate generally to a memory system.

BACKGROUND

As memory systems used in a computer system, SSDs (Solid State Drive), on which a nonvolatile semiconductor memory such as a NAND-type flash memory (hereinafter, simply NAND memory) is mounted, attract attention. SSDs have advantages such as high speed and lightweight compared with magnetic disk devices.

BRIEF DESCRIPTION OF THE DRAWINGS

FIG. 4A and FIG. 4B are timing charts explaining continuous write processing to the memory chip;

FIG. 5 is a diagram explaining a data configuration example of each entry configuring a NANDC descriptor relating to a normal write;

FIG. 6 is a diagram explaining a specific example of a data structure of the NANDC descriptor relating to a normal write;

FIG. 7 is a diagram explaining a specific example a data structure of a post-processing descriptor;

FIG. 8 is a diagram explaining a specific example a data structure of a pre-processing descriptor;

FIG. 9 is a diagram illustrating a data structure example of reference data registered in a normal queue;

FIG. 10 is a diagram illustrating a data structure example of reference data registered in a priority queue;

FIG. 16 is a flowchart explaining an operation of a NANDC control unit;

FIG. 17A to FIG. 17C are flowcharts explaining an operation of a progress management of a pack by a queue managing unit;

FIG. 18 is a flowchart explaining a switching operation of a queue by the queue managing unit;

FIG. 19 is a diagram illustrating a specific example of a data structure of the NANDC descriptor for performing continuous write processing on two planes;

FIG. 20 is a diagram illustrating a specific example of a data structure of the post-processing descriptor used when performing continuous write processing on two planes;

DETAILED DESCRIPTION

In general, according to one embodiment, a memory system includes a nonvolatile memory, a temporary memory and a data transfer device configured to perform data transfer between a host apparatus and the nonvolatile memory by using the temporary memory as a buffer. The data transfer device includes a first command generating unit, a second command generating unit, a first storage unit, a second storage unit, and a nonvolatile memory managing unit. The first command generator is configured to generate a first command for reading out data, for which a read request is issued from the host apparatus, from the nonvolatile memory. The second command generator is configured to generate a second command for internal processing of the memory system associated with the temporary memory and the nonvolatile memory. The first memory has a queue structure and is configured to store the first command. The second memory has a queue structure and is configured to store the second command. The memory manager is configured to read out the first command stored in the first memory in priority to the second command stored in the second memory and to transmit read-out command to the nonvolatile memory.

Exemplary embodiments of a memory system will be explained below in detail with reference to the accompanying drawings. The present invention is not limited to the following embodiments. In the following explanation, an example of applying the memory system in the embodiments in the present invention to an SSD is explained, however, a subject to which the memory system in the embodiment in the present invention is applied is not limited to an SSD. That is, the embodiments in the present invention can be applied to general memory systems that include a nonvolatile semiconductor memory and a controller controlling the nonvolatile semiconductor memory. Moreover, the memory system may be non-removably mounted in a host apparatus or may be a removable device, such as a memory card, removable from the host apparatus.

Figure 1:
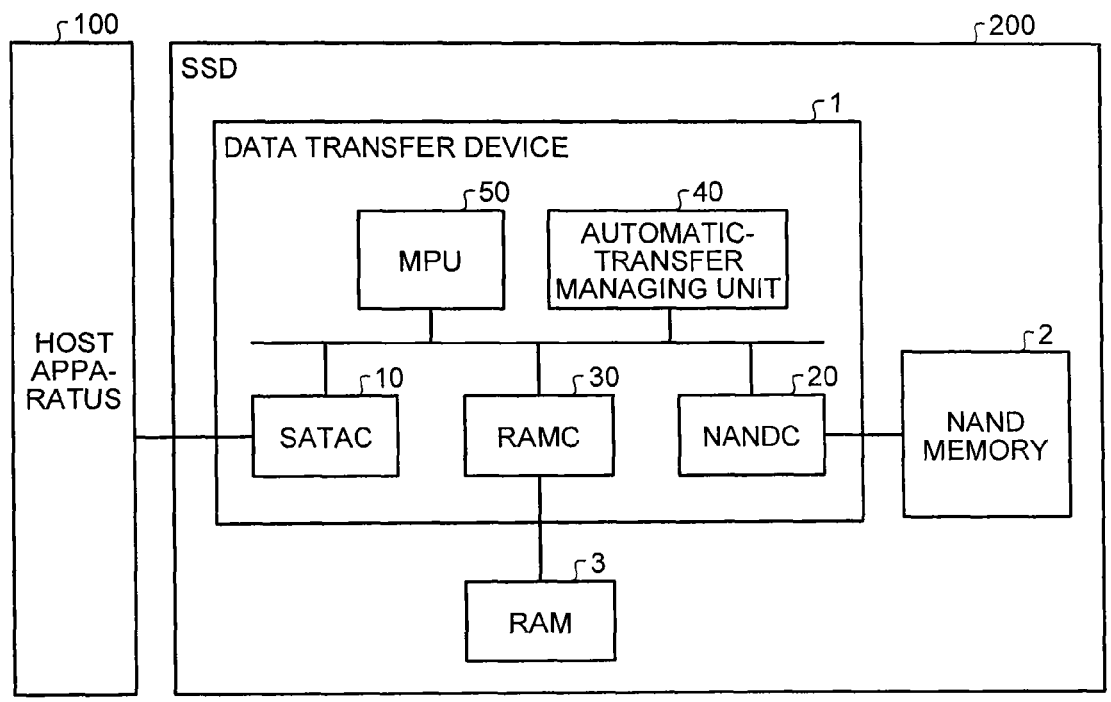
FIG. 1 is a diagram explaining a configuration of an SSD to which a memory system in a first embodiment is applied.

FIG. 1 is a diagram explaining a configuration of an SSD to which a memory system in a first embodiment is applied. An SSD 200 is connected to a host apparatus (hereinafter, also called host) 100, such as a personal computer, with a communication interface of a SATA (Serial Advanced Technology Attachment) standard to function as an external storage device of the host apparatus 100. A read/write request that the SSD 200 receives from the host apparatus 100 includes a top address of a subject to be accessed, which is defined by LBA (Logical Block Addressing), and a sector size indicating a range of a region of the subject to be accessed. The communication interface is not limited to the SATA standard and various communication interface standards, such as SAS (Serial Attached SCSI) and PCIe (PCI Express), can be employed.

The SSD 200 includes a data transfer device 1, a NAND memory 2, and a RAM 3. The data transfer device 1, the NAND memory 2, and the RAM 3 are, for example, arranged on a common substrate as chips dependent from each other. The RAM 3 may be mounted together with the data transfer device 1.

The data transfer device 1 includes a SATA interface controller (SATAC) 10 that performs control of the SATA I/F and data transfer between the host apparatus 100 and the RAM 3, a RAM controller (RAMC) 30 that controls writing/reading of data with respect to the RAM 3, a NAND controller (NANDC) 20 that performs data transfer between the NAND memory 2 and the RAM 3, an automatic-transfer managing unit 40 that controls timing of causing each of the SATAC 10 and the NANDC 20 to perform data transfer, and an MPU 50 that performs control of the data transfer device 1 based on firmware. The MPU 50 functions, specially, as a second command generating unit that generates a command for the NAND memory 2 for performing data transfer relating to internal processing of the SSD 200 as part of control of the data transfer device 1. A specific example of data transfer relating to internal processing will be explained later. The SATAC 10, the NANDC 20, the RAMC 30, the automatic-transfer managing unit 40, and the MPU 50 are bus-connected.

Figure 2:
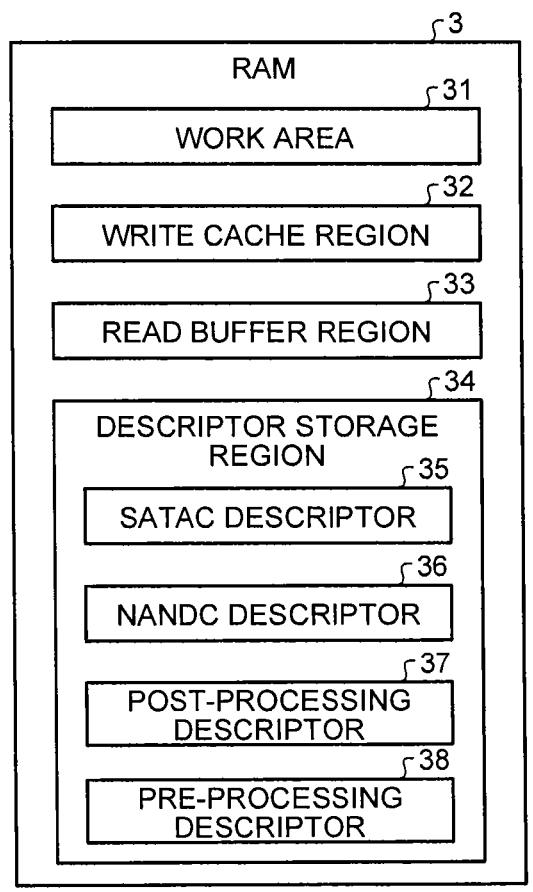
FIG. 2 is a diagram explaining a memory structure of a RAM.

The RAM 3 is composed of a volatile or nonvolatile randomly accessible storage device that performs a high-speed operation compared with the NAND memory 2, such as a DRAM (Dynamic Random Access Memory), an SRAM (Static Random Access Memory), an MRAM (Magnetoresistive Random Access Memory), an FeRAM (Ferroelectric Random Access Memory). FIG. 2 is a diagram explaining a memory structure of the RAM 3. As shown in FIG. 2, the RAM 3 includes a work area 31 in which an address translation table, in which a correspondence relationship between LBA and physical addresses of the NAND memory 2 is described, and the like are loaded, a write cache region 32 that caches data for which a write request is issued from the host apparatus 100, a read buffer region 33 that temporarily stores data for which a read request is issued from the host apparatus 100 and which is read out from the NAND memory 2, and a descriptor storage region 34 in which a SATAC descriptor 35, a NANDC descriptor 36, a post-processing descriptor 37, and a pre-processing descriptor 38 are stored. Details of each descriptor stored in the descriptor storage region 34 will be described later.

The NAND memory 2, for example, stores write data from the host apparatus 100 and stores backup data and differential data of an address translation table loaded in the work area 31. The NAND memory 2 includes one or more memory chips. When the NAND memory 2 includes a plurality of memory chips, a high-speed operation can be realized by driving the memory chips in parallel. The NAND memory 2 may be a single level memory (SLC: Single Level Cell) that stores 1 bit in one memory cell or a multi-level memory (MLC: Multi Level Cell) that stores 2 or more bits in one memory cell. In the followings, the NAND memory 2 is explained as a multi-level memory.

Figure 3:
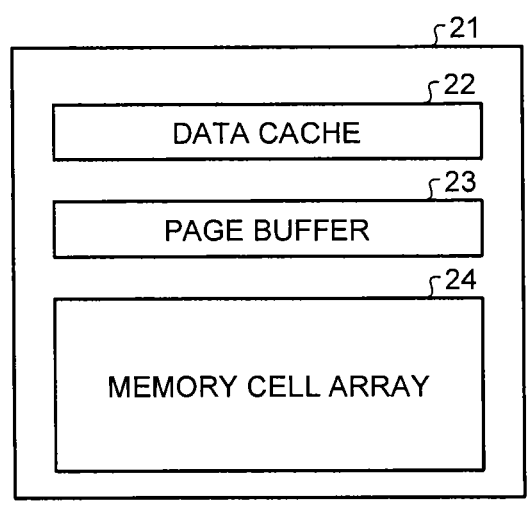
FIG. 3 is a diagram explaining a configuration of a memory chip.

FIG. 3 is a diagram explaining a configuration of a memory chip. As shown in FIG. 3, a memory chip 21 includes a data cache 22, a page buffer 23, and a memory cell array 24. The memory cell array 24 is configured by arraying a plurality of memory cells in a matrix manner, and each memory cell can perform multi-level recording by using an upper page and a lower page. Moreover, the memory cell array 24 includes a plurality of physical blocks as a unit of erasing and each physical block includes a plurality of physical pages (hereinafter, simply page) as a unit of reading and writing.

The data cache 22 and the page buffer 23, for example, include a storage capacity for 1 page. The data cache 22 is used as a buffer for the memory chip 21 transmitting and receiving data to and from the NANDC 20, and the page buffer 23 is used as a buffer for the memory chip 21 inputting and outputting data to and from the memory cell array 24. Specifically, in write processing, the memory chip 21 receives write data transmitted from the NANDC 20 in the data cache 22 and copies the received write data into the page buffer 23. Then, the write data stored in the page buffer 23 is programmed into the memory cell array 24. When programming, the memory chip 21 compares the programmed write data with write data stored in the page buffer 23 to verify whether the write data is programmed correctly. In read processing, the memory chip 21 reads out target data to the page buffer 23 from the memory cell array 24 and copies the read data stored in the page buffer 23 into the data cache 22. The read data stored in the data cache 22 is transmitted to the NANDC 20 by a data output signal (for example, RE signal).

A data transfer sequence performed by the SSD 200 is classified into four as below.

(1) Data transfer of reading out data, for which a read request is issued from the host apparatus 100, to the read buffer region 33 from the NAND memory 2 and transmitting the data read out to the read buffer region 33 to the host apparatus 100

(2) Data transfer of writing data, for which a write request is issued from the host apparatus 100 and which is transmitted from the host apparatus 100, into the write cache region 32.

(3) Data transfer from the NAND memory 2 to the RAM 3 relating to internal processing. For example, an operation of loading an address translation table into the work area 31 corresponds to this data transfer. Moreover, for example, an operation of once reading out a storage content of the NAND memory 2 to the work area 31 when rearranging data stored in the NAND memory 2 in order of LBA or generating a free block corresponds to this data transfer.

(4) Data transfer from the RAM 3 to the NAND memory 2 relating to internal processing. An operation of saving write data cached in the write cache region 32 into the NAND memory 2, an operation of backing up an address translation table, an operation of recording difference of an address translation table into the NAND memory 2, and an operation of writing back data read out to the work area 31 to the NAND memory 2 when rearranging data stored in the NAND memory 2 in order of LBA or generating a free block correspond to this data transfer.

According to the first embodiment of the present invention, the SSD 200 performs data transfer relating to (1) and (2) accompanied by transmission and reception of data to and from the host apparatus 100 in priority to data transfer relating to (3) and (4) of performing transmission and reception of data only in the SSD 200, for improving a response speed with respect to the host apparatus 100. As a configuration for the above, the SSD 200 includes a priority queue 61 of queuing a command for performing data transfer relating to (1) among commands to be transmitted to the NAND memory 2 and a normal queue 62 of queuing a command for performing data transfer relating to (3) and (4). Then, when a command is registered in the priority queue 61, the SSD 200 switches a queue to be an execution target from the normal queue 62 to the priority queue 61. In the followings, data transfer of (1), data transfer of (2), data transfer of (3), and data transfer of (4) are described as a priority read, a priority write, a normal read, and a normal write, respectively.

Figure 4A:
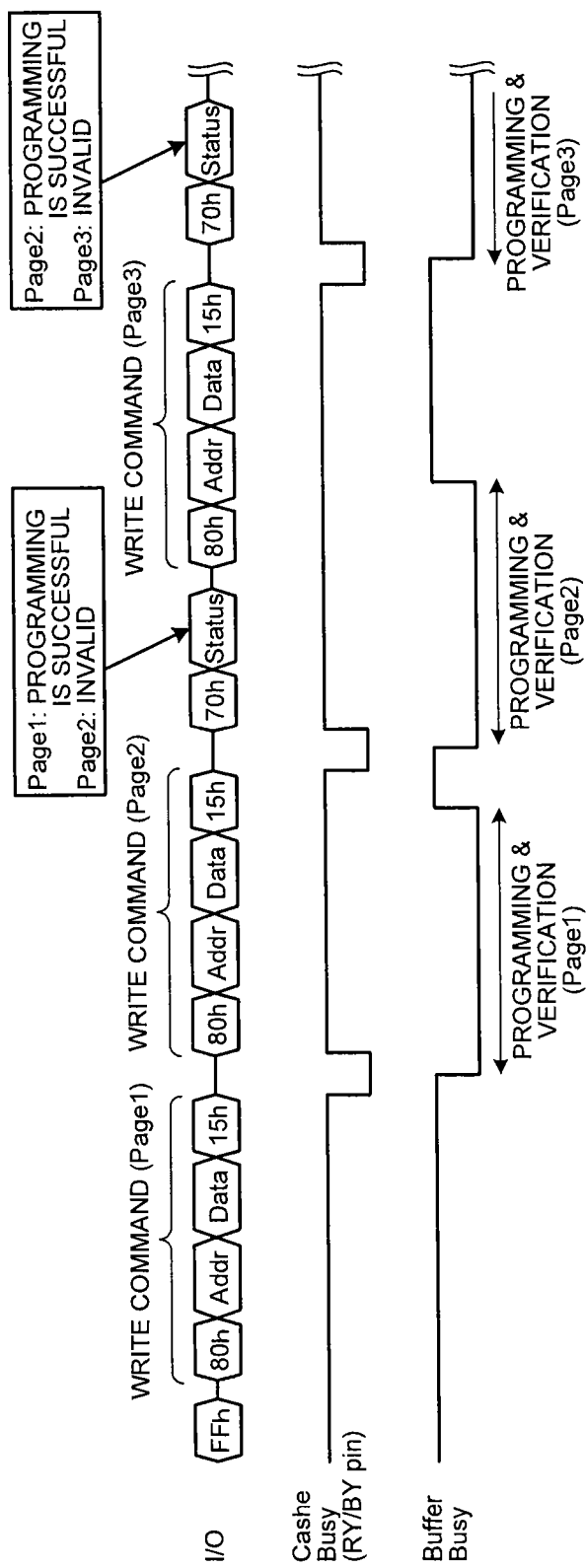

The memory chip 21 can accelerate continuous writing to a plurality of pages by performing reception of write data and programming of write data in parallel. FIG. 4A and FIG. 4B are timing charts explaining continuous write processing to the memory chip 21. In FIG. 4A and FIG. 4B, the timing chart illustrated in the upper stage indicates the status of an I/O pin of the memory chip 21, the timing chart illustrated in the middle stage indicates the status of the data cache 22, and the timing chart illustrated in the lower stage indicates the status of the page buffer 23. In this embodiment, write data for n pages is continuously written.

As shown in FIG. 4, first, a reset command (FFh) is input to the memory chip 21 from the I/O pin. A write command for the first page is received. Thereafter, a write command and a status read command (70h) for each page are alternately received. A write command for each page includes a write notice command (80h), a write destination address (Addr), write data (Data), and a write start command (15h). The memory chip 21 receives write data on the i-th (1≤i≤n) page transmitted by the write command in the data cache 22. Then, when the write start command (15h) is received, the memory chip 21 copies the write data stored in the data cache 22 into the page buffer 23. During copying, the status of the data cache 22 is busy. Next, the memory chip 21 programs the write data, which is copied into the page buffer 23 from the data cache 22, into the memory cell array 24. After programming, the write data programmed into the memory cell array 24 is verified. While programming and verification are performed, the status of the page buffer 23 becomes busy. In the following, an operation including programming and verification is simply described as programming.

On the other hand, the memory chip 21 outputs the status of the data cache 22 to a RY/BY pin. When the RY/BY pin becomes ready, that is, when copying from the data cache 22 into the page buffer 23 is completed, the status read command (70h) is input from the NANDC 20 that detects that the RY/BY pin becomes ready. When the memory chip 21 receives the status read command (70h), the memory chip 21 outputs status information (Status). When the memory chip 21 receives the status read command after a write command relating to the write data on the i-th page, the memory chip 21 outputs whether programming relating to the write data on each of the i-th page and the (i−1)th page was successful as the status information. When the memory chip 21 receives the status read command (70h) at the timing shown in FIG. 4A, the memory chip 21, for example, outputs the status information indicating that programming of the (i−1)th page is successful and the i-th page is invalid (in programming). When the NANDC 20 receives the status information indicating that programming of the (i−1)th page is successful, the NANDC 20 transmits a write command for the (i+1)th page.

In this manner, when the continuous write processing is performed, programming of write data on the i-th page and transmission and reception of a write command for the (i+1)th page are performed simultaneously, so that time required for programming is hidden and therefore programming efficiency of data is improved.

When the NANDC 20 performs different processing (for example, read processing) after the continuous write processing, the NANDC 20 needs to keep transmission of a command relating to the different processing on standby until programming of last transmitted write data is completed. Therefore, as shown in FIG. 4B, immediately after the RY/BY signal becomes ready after transmitting a write command for the n-th page, the NANDC 20 transmits the status read command and thereafter further repeatedly transmits the status read command until the status information indicating that programming of write data on the n-th page is successful is obtained. In the following, an operation of repeatedly transmitting the status read command until the status information indicating that programming of last transmitted write data is successful is obtained is described as status polling and the status read command for the status polling is specially described as a status polling command.

This continuous write processing is performed as one of the normal writes. In the continuous write processing, a write command for the next page is transmitted before completing programming into the memory cell array 24, so that when a command relating to different processing needs to be performed by interrupting execution of a series of commands configuring the continuous write processing, the SSD 200 needs to wait until write data transmitted to the NAND memory 2 immediately before interruption is programmed into the memory cell array 24. Therefore, when interrupting the continuous write processing, the SSD 200 causes the NAND memory 2 to execute the status polling command as the post-processing, and keeps transmission of a command relating to the priority queue 61 on standby until completing programming of write data transmitted immediately before interruption. Moreover, when resuming transmission of a command relating to the interrupted continuous write processing, the SSD 200 causes the NAND memory 2 to execute a reset command as the pre-processing and resets a storage content of the data cache 22 and the page buffer 23.

The entity of a command registered in each of the normal queue 62 and the priority queue 61 is described in entries configuring the NANDC descriptor 36 stored in the descriptor storage region 34, and in the normal queue 62 and the priority queue 61, data (hereinafter, reference data), in which a variable for referring to corresponding entries in the NANDC descriptor 36 is described, is registered. The entities relating to the pre-processing and the post-processing are loaded in the descriptor storage region 34 in advance as the post-processing descriptor 37 and the pre-processing descriptor 38, respectively.

FIG. 5 is a diagram explaining a data configuration example of each entry configuring the NANDC descriptor 36 relating to the normal write. Each entry configuring the NANDC descriptor 36 includes a command field, in which a command transmitted to the NAND memory 2 is described, and a continuous input instruction flag. The continuous input instruction flag indicates that a command relating to an entry in the subsequent stage needs to be continuously executed or can be interrupted. One entry can be generated with respect to a plurality of commands. In this embodiment, a plurality of commands (80h, Addr, Data, 11h) configuring a write command for each page is described by one entry and the reset command (FFh) and the status read command (70h) are each described by an individual entry.

FIG. 6 is a diagram explaining a specific example of a data structure of the NANDC descriptor 36 relating to the normal write. An example shown in FIG. 6 corresponds to a series of commands for performing the continuous write processing shown in FIG. 4B. That is, according to this example, the NANDC descriptor 36 is configured to include an entry in which the reset command (FFh) is described, an entry in which a write command for the first page is described, repetition of an entry in which a write command for each page relating to second and subsequent pages is described and the status read command (70h), and an entry in which the status polling command (70h) is described from the upper stage. The value of the continuous input instruction flag of a write command for each page excluding the first page is "1" indicating that a command relating to an entry in the subsequent stage needs to be continuously executed and the value of the continuous input instruction flag of the status read command (70h), a write command for the first page, and the status polling command (70h) is "0" indicating that execution of continuous commands can be interrupted.

Data transfer between the NAND memory 2 and the RAM 3 by the NANDC 20 is performed at a time of performing the normal write, the normal read, and the priority read. In terms of the NAND memory 2, because the normal read does not include processing of programming into the NAND memory 2, the normal read can be interrupted without requiring the post-processing. Moreover, because a queue is not switched during execution of the priority read, the priority read is not interrupted. Therefore, the continuous input instruction flag can be omitted from entries of the NANDC descriptor 36 relating to the normal read and the priority read.

FIG. 7 is a diagram explaining a specific example a data structure of the post-processing descriptor 37 and FIG. 8 is a diagram explaining a specific example a data structure of the pre-processing descriptor 38. The post-processing descriptor 37 is composed of an entry in which the status read command (70h) is described and the pre-processing descriptor 38 is composed of an entry in which the status polling command (70h) is described.

FIG. 9 is a diagram illustrating a data structure example of reference data registered in the normal queue 62 and FIG. 10 is a diagram illustrating a data structure example of reference data registered in the priority queue 61. The reference data registered in the normal queue 62 and the reference data registered in the priority queue 61 include a field in which a top address of a target entry is described and a field in which the number of entries is described. That is, a plurality of entries stored in the descriptor storage region 34 can be referred to by one reference data. With the use of this, for example, an entry group relating to the continuous write processing shown in FIG. 6 can be referred to by one reference data. In the following, an entry group referred to by one reference data is described as a pack. Moreover, an operation of generating one pack of an entry group is described as "generating a pack" and an operation of registering reference data in a queue is described as "registering a pack" in some cases. The number of entries corresponding to one pack is arbitrary, however, a plurality of entries, which can share a value of a post-processing flag (to be described later) and are executed continuously, may be collected in one pack.

The reference data registered in the normal queue 62 includes a field in which the post-processing flag is described. The post-processing flag is a flag indicating whether the post-processing needs to be inserted when interrupting execution of an entry group configuring a pack in the middle. For example, in reference data relating to the continuous write processing, a value indicating that insertion of the post-processing is needed is described in the field. Moreover, in reference data relating to processing that can be interrupted without requiring the post-processing, such as data transfer relating to the normal read, a value indicating that insertion of the post-processing is not needed is described in the field.

In the SSD 200, a queue, in which reference data specifying entries of the SATAC descriptor 35 is registered, is included in a router unit 43 (to be described later). Each entry of the SATAC descriptor 35, for example, includes an address of an access destination on the RAM 3 and information indicating any of reading of writing. The SATAC 10 transfers data stored in an address (that is, a specified position in the read buffer region 33) of an access destination described in an entry to the host apparatus 100 at the time of reading and stores write data sent from the host apparatus 100 in an address (that is, a specified position in the write cache region 32) of an access destination described in an entry at the time of writing. The SATAC 10 performs data transfer between the host apparatus 100 and the RAM 3 when performing the priority read and the priority write. In the present embodiment, in the similar manner to the NANDC descriptor 36, in a queue of the router unit 43, reference data is registered for each pack, however, reference data may be registered for each entry in the router unit 43.

Generation and registration of a pack relating to the normal read, the normal write, and the priority write are performed by the MPU 50 and generation and registration of a pack relating to the priority read are performed by a transfer preparing unit 42 included in the automatic-transfer managing unit 40.

Figure 11:
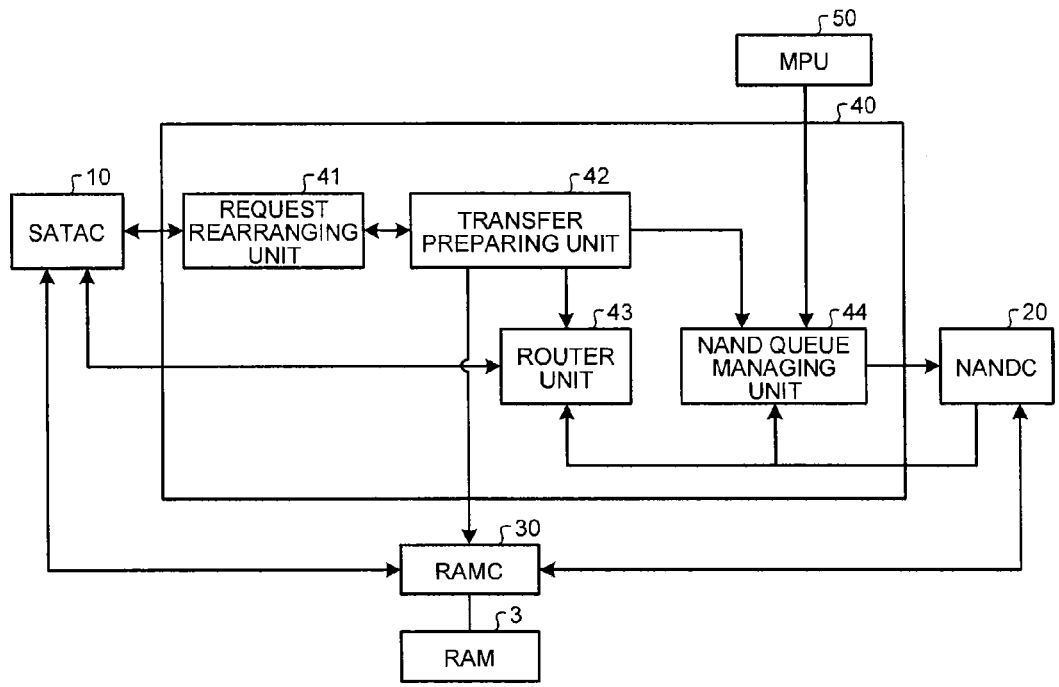
FIG. 11 is a block diagram explaining a configuration of an automatic-transfer managing unit.

FIG. 11 is a block diagram explaining a configuration of the automatic-transfer managing unit 40. As shown in FIG. 11, the automatic-transfer managing unit 40 includes a request rearranging unit 41, the transfer preparing unit (first command generating unit) 42, the router unit 43, and a NAND queue managing unit 44.

The request rearranging unit 41 obtains a plurality of read/write requests received from the host apparatus 100 from the SATAC 10 and rearranges an execution order of the obtained read/write requests into an order in which the read/write requests can be efficiently performed.

The transfer preparing unit 42 performs generation of a pack and registration of the generated pack based on the read/write requests rearranged by the request rearranging unit 41. Registration of a pack relating to the SATAC descriptor 35 is performed on the router unit 43 and registration of a pack relating to the NANDC descriptor 36 is performed on the NAND queue managing unit 44.

As described above, the router unit 43 includes a queue in which a pack relating to the SATAC descriptor 35 is registered. The router unit 43 causes the SATAC 10 to sequentially perform each data transfer described in an entry group of the SATAC descriptor 35 corresponding to the pack registered in the queue by notifying the SATAC 10 of an execution instruction for each entry. When performing the priority read, the router unit 43 notifies the SATAC 10 of an execution instruction at the timing based on the reception timing of an execution completion notification transmitted from the NANDC 20 and an execution completion notification transmitted from the SATAC 10, and when performing the priority write, the router unit 43 notifies the SATAC 10 of an execution instruction at the timing based on the reception timing of an execution completion notification transmitted from the SATAC 10.

Figure 12:
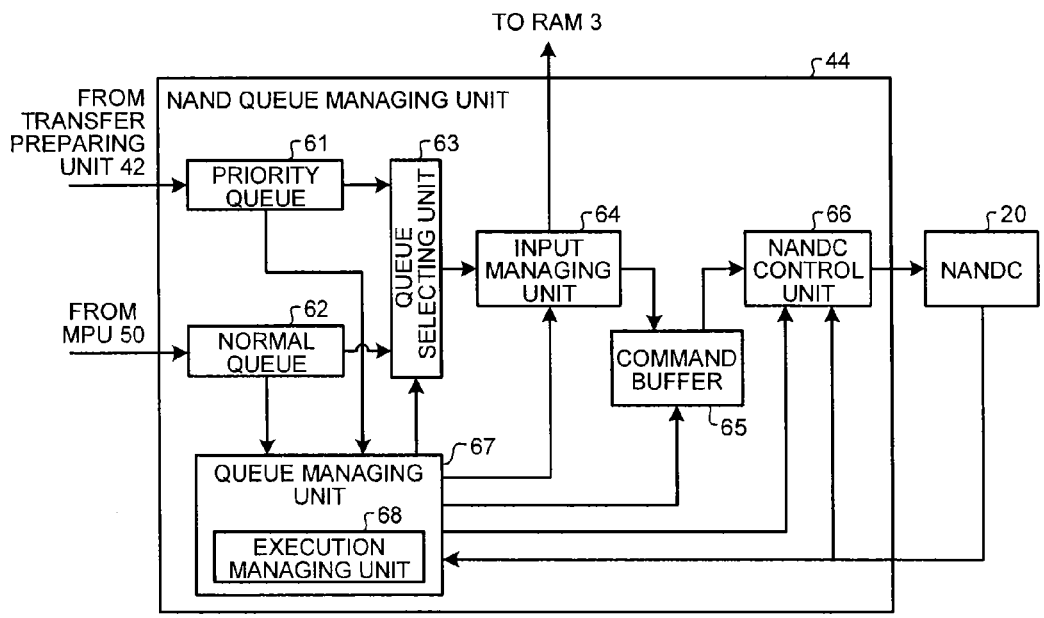
FIG. 12 is a diagram explaining an internal configuration of a NAND queue managing unit.

FIG. 12 is a diagram explaining an internal structure of the NAND queue managing unit 44. As shown in FIG. 12, the NAND queue managing unit 44 includes the priority queue 61, the normal queue 62, a queue selecting unit 63, an input managing unit 64, a command buffer 65, a NANDC control unit 66, and a queue managing unit 67.

In the priority queue 61, reference data relating to the priority read is registered by the transfer preparing unit 42, and in the normal queue 62, reference data relating to the normal write and reference data relating to the normal read are registered by the MPU 50.

The queue selecting unit 63, the input managing unit 64, the command buffer 65, the NANDC control unit 66, and the queue managing unit 67 cooperate with the NANDC 20 to function as a nonvolatile memory managing unit that reads out reference data registered in the priority queue 61 in priority to reference data registered in the normal queue 62 and transmits a command corresponding to the read out reference data to the NAND memory 2. In the following, each component configuring the nonvolatile memory managing unit is specifically explained.

The queue selecting unit 63 selects any one of the priority queue 61 and the normal queue 62 based on a selection signal from the queue managing unit 67. The input managing unit 64 reads out reference data from a queue selected by the queue selecting unit 63, and reads out an entry group of the NANDC descriptor 36 referred to by the read out reference data from the descriptor storage region 34 and stores it in the command buffer 65. Moreover, when the input managing unit 64 receives a stop request notification (to be described later) from the queue managing unit 67, the input managing unit 64 stops the operation.

The NANDC control unit 66 sequentially transmits entries stored in the command buffer 65 to the NANDC 20. Moreover, when the NANDC control unit 66 receives a stop request from the queue managing unit 67, the NANDC control unit 66 refers to the value of the continuous input instruction flag included in an entry last transmitted to the NANDC 20 and, in the case where the value of the flag is "0" indicating that the continuous write processing can be interrupted, stops transmission of the next entry and notifies the queue managing unit 67 of a stop enable notification. When the value of the continuous input instruction flag is "1" indicating that commands need to be input continuously, the NANDC control unit 66 continues transmission of an entry until an entry whose value of the flag is "0" is transmitted.

The NANDC 20 transmits a command relating to each transmitted entry to the NAND memory 2 and issues an execution completion notification every time the NAND memory 2 completes execution of a command relating to each entry. The NANDC control unit 66 transmits the next entry to the NAND memory 2 with an execution completion notification from the NANDC 20 as a trigger.

The queue managing unit 67 monitors the priority queue 61 and the normal queue 62, and, when reference data is registered in only any one of them, transmits a selection signal of selecting a queue in which the reference data is registered to the queue selecting unit 63. Furthermore, when reference data is registered in the priority queue 61 in a state where the normal queue 62 is selected, the queue managing unit 67 transmits a stop request to the NANDC control unit 66 and the input managing unit 64. Thereafter, when a stop enable response is received from the NANDC control unit 66, the queue managing unit 67 flushes a storage content of the command buffer 65 and instructs the input managing unit 64 to store the post-processing descriptor 37 in the command buffer 65. Thereafter, a selection signal input to the queue selecting unit 63 is switched from the normal queue 62 to the priority queue 61 and an operation of the input managing unit 64 and the NANDC control unit 66 is resumed. When the priority queue 61 becomes empty, the queue managing unit 67 instructs the input managing unit 64 to store the pre-processing descriptor 38 in the command buffer 65 and switches a selection signal from the priority queue 61 to the normal queue 62.

Moreover, the queue managing unit 67 performs progress control of the NANDC descriptor 36 based on an execution completion notification issued by the NANDC 20 and the number of entries described in reference data. Moreover, the queue managing unit 67 includes an execution managing unit 68 that designates reference data of an input target among reference data registered in the normal queue 62.

The NAND memory 2 employs a bank construction using a plurality of the memory chips 21 in some cases. In this case, the configuration may be such that the command buffer 65, the NANDC control unit 66, and the NANDC 20 are provided for each bank and, when inputting an entry, the input managing unit 64 sorts and inputs an entry into the command buffers 65 of respective banks.

Next, an operation of the SSD 200 in the first embodiment of the present invention is explained.

Figure 13:
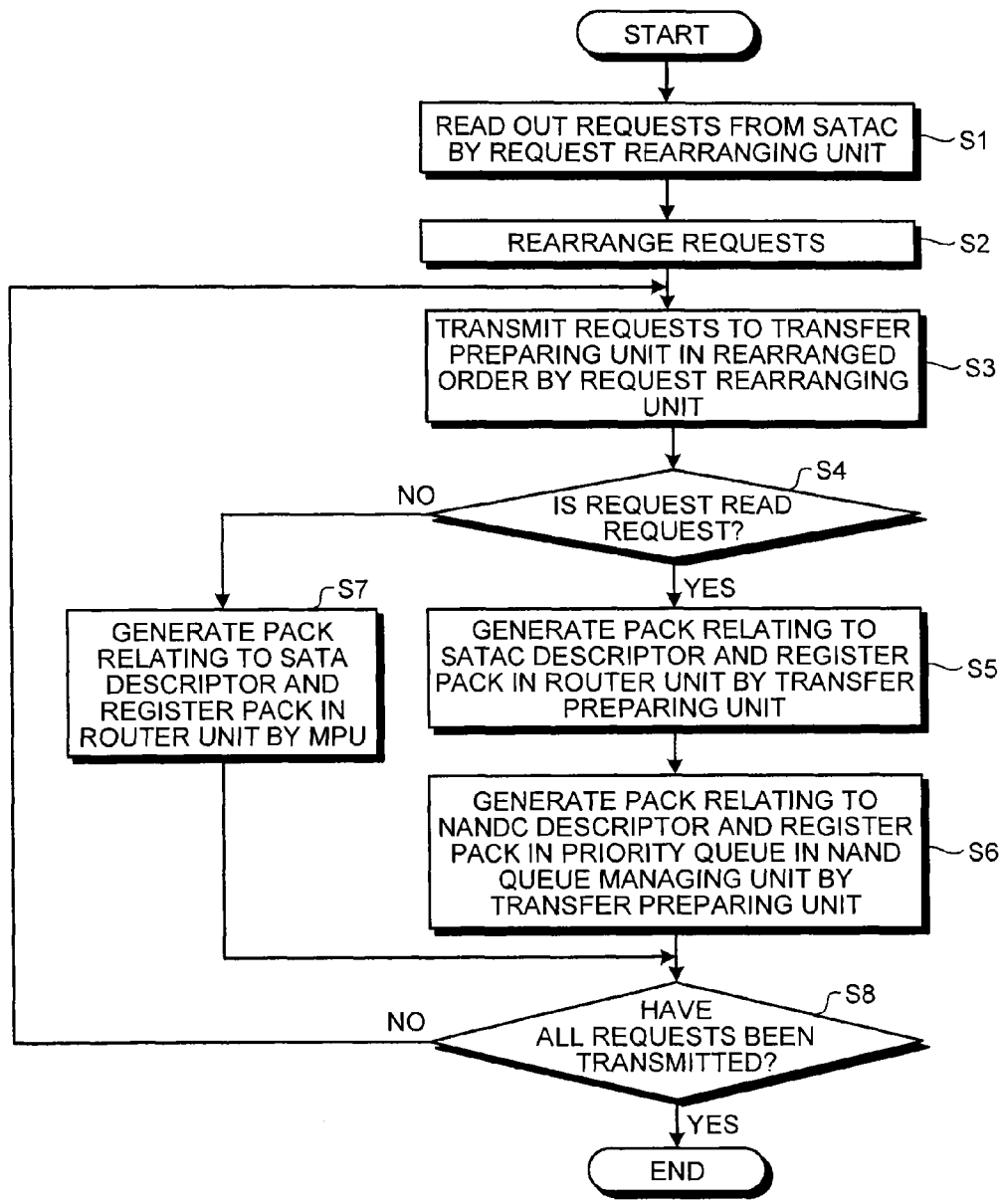
FIG. 13 is a flowchart explaining an operation of registering a pack in a priority queue.

FIG. 13 is a flowchart explaining an operation of registering a pack in the priority queue 61. First, the request rearranging unit 41 reads out one or more requests from the SATAC 10 (Step S1) and rearranges the read out requests (Step S2). Then, the request rearranging unit 41 transmits one of the rearranged requests to the transfer preparing unit 42 (Step S3).

The transfer preparing unit 42 determines whether the transmitted request is a read request (Step S4). When the transmitted request is a read request (Yes in Step S4), the transfer preparing unit 42 generates a pack relating to the SATAC descriptor 35 and registers the pack in the router unit 43 (Step S5). Then, the transfer preparing unit 42 generates a pack relating to the NANDC descriptor 36 and registers the pack in the priority queue 61 included in the NAND queue managing unit 44 (Step S6).

When the transmitted request is not a read request (No in Step S4), that is, when the transmitted request is a write request, the transfer preparing unit 42 requests the MPU 50 to perform generation of a pack relating to the SATAC descriptor 35 and registration of the pack in the router unit 43 (Step S7).

After the processing in Step S6 and Step S7, the request rearranging unit 41 determines whether all of the rearranged requests are transmitted to the transfer preparing unit 42 (Step S8), and, when there is an untransmitted request (No at Step S8), the request rearranging unit 41 moves to Step S3 and transmits one untransmitted request to the transfer preparing unit 42. When all of the requests have been transmitted (Yes in Step S8), an operation of registering a pack in the priority queue 61 ends.

Figure 14:
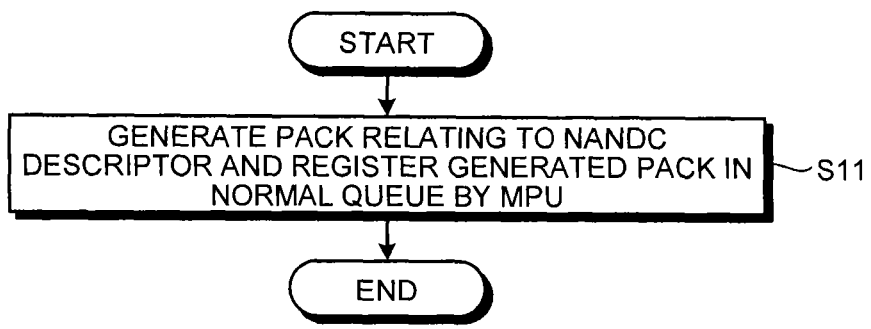
FIG. 14 is a flowchart explaining an operation of registering a pack in a normal queue.

FIG. 14 is a flowchart explaining an operation of registering a pack in the normal queue 62. As shown in FIG. 14, the MPU 50 generates a pack relating to the NANDC descriptor 36 and registers the generated pack in the normal queue 62 based on firmware (Step S11). Then, an operation of registering a pack in the normal queue 62 ends.

Figure 15:
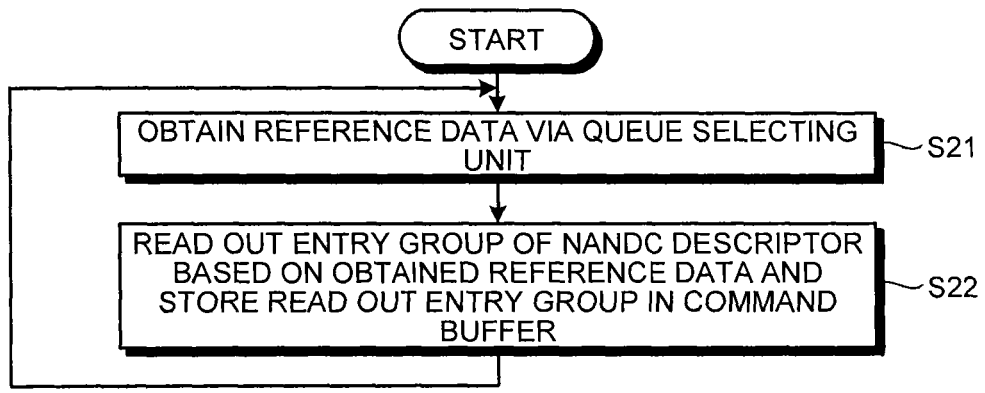
FIG. 15 is a flowchart explaining an operation of an input managing unit.

FIG. 15 is a flowchart explaining an operation of the input managing unit 64. The input managing unit 64 reads out one reference data from the priority queue 61 or the normal queue 62 via the queue selecting unit 63 (Step S21). The input managing unit 64 reads out reference data designated as an input target by the execution managing unit 68 from among reference data registered in a queue selected by the queue selecting unit 63 among the queues (the priority queue 61 or the normal queue 62). The input managing unit 64 reads out an entry group of the NANDC descriptor 36 referred to by the read out reference data from the descriptor storage region 34 and stores the read out entry group in the command buffer 65 (Step S22). The input managing unit 64 performs the processing in Step S21 and the processing in the Step S22 alternately.

FIG. 16 is a flowchart explaining an operation of the NANDC control unit 66. The NANDC control unit 66 retrieves one of the entries stored in the command buffer 65 and transmits the retrieved entry to the NANDC 20 (Step S31). Then, the NANDC control unit 66 performs determination of whether a stop request notification is received (Step S32) and determination of whether an execution completion notification is received (Step S33) alternately, and, when a stop request notification is not received (No in Step S32) and an execution completion notification is received (Yes in Step S33), the NANDC control unit 66 moves to Step S31 and transmits the next entry to the NANDC 20.

When a stop request notification is received (Yes in Step S32), the NANDC control unit 66 determines whether an execution completion notification is received (Step S34), and when an execution completion notification is not received (No in Step S34), the NANDC control unit 66 performs the determination processing in Step S34 until receiving an execution completion notification. When an execution completion notification is received (Yes in Step S34), the NANDC control unit 66 determines whether the value of the continuous input instruction flag of an entry transmitted to the NANDC 20 by the last performed processing in Step S31 is "0" (Step S35). When the value of the continuous input instruction flag is not "0" (No in Step S35), the NANDC control unit 66 retrieves one next entry from the command buffer and transmits the retrieved entry to the NANDC 20 (Step S36). Then, the determination processing in Step S34 is performed.

When the value of the continuous input instruction flag is "0" (Yes in Step S35), the NANDC control unit 66 transmits a stop enable notification to the queue managing unit 67 (Step S37). Then, after flushing of the command buffer 65 by the queue managing unit 67 and storing of an entry in the command buffer 65 by the input managing unit 64 are performed (Step S38), when an operation resume notification indicating that an operation is resumed is received from the queue managing unit 67 (Step S39), the NANDC control unit 66 performs processing in Step S31.

Figure 17B:
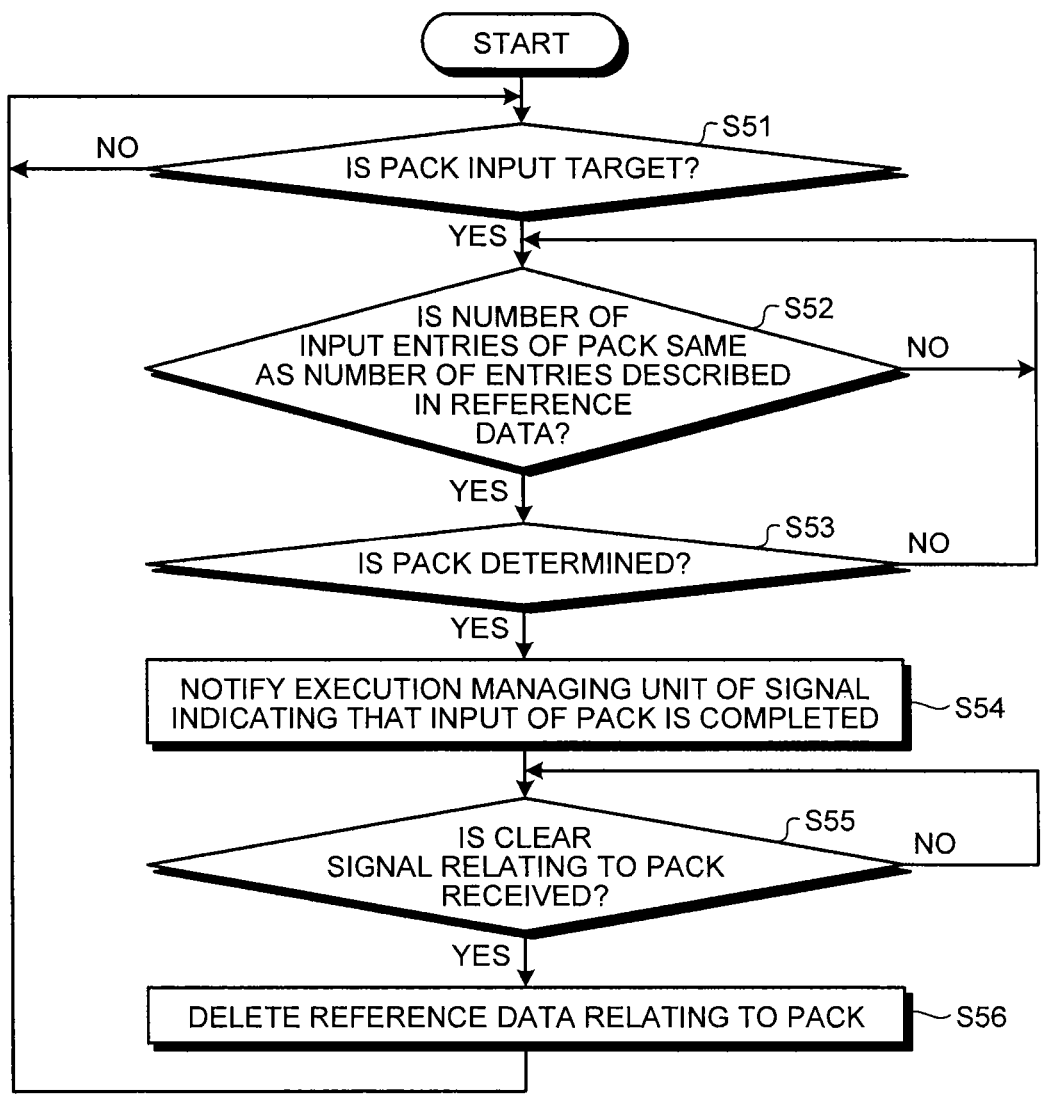
Figure 17C:
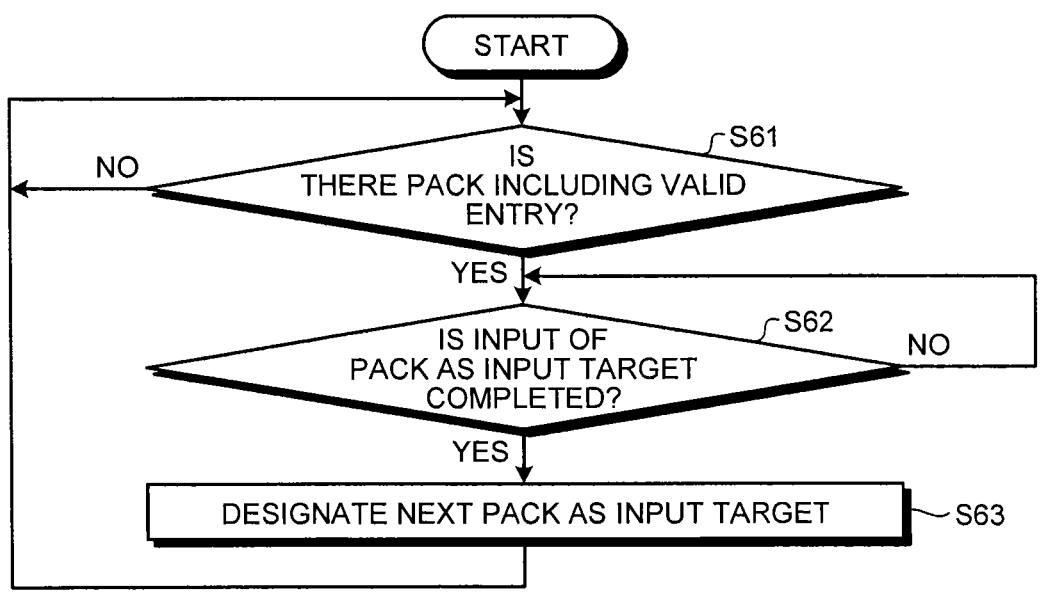

FIG. 17A to FIG. 17C are flowcharts explaining an operation of progress management of a pack by the queue managing unit 67. FIG. 17A is a flowchart explaining an operation of managing whether processing relating to an individual pack is completed. As shown in FIG. 17A, the queue managing unit 67 first determines whether a valid entry is included in one pack (Step S41). In this embodiment, the queue managing unit 67 includes a Valid signal as an internal signal, which sets a pack including a valid entry to valid and sets a pack that does not includes a valid entry to invalid, for each pack. That is, in Step S41, the queue managing unit 67 determines whether the Valid signal relating to the pack is valid. When the Valid signal is invalid (No in Step S41), the determination processing in Step S41 is repeated until the Valid signal becomes valid.

When the Valid signal is valid (Yes in Step S41), the queue managing unit 67 determines whether the number of executed entries of the pack matches the number of entries described in reference data (Step S42). The number of executed entries can be obtained by counting an execution completion notification issued by the NANDC 20. When the number of executed entries matches the number of entries described in reference data (Yes in Step S42), the queue managing unit 67 further determines whether the pack is determined (Step S43).

Translation between a physical address and a logical address requires a relatively long time, so that the registration source (the MPU 50 and the transfer preparing unit 42) of a pack is configured to be capable of not only collectively registering entries for one pack but also sequentially registering an entry every time each entry configuring one pack is generated. The registration source increments the number of entries described in corresponding reference data every time an entry is stored in the descriptor storage region 34. Then, when entries for one pack are stored, the registration source issues a notification indicating that entries for one pack are determined. In Step S42, by checking whether a notification indicating that entries for one pack are completed for a target pack is received, the queue managing unit 67 can determine whether the pack is determined.

When the number of executed entries does not match the number of entries described in reference data (No in Step S42), or when the pack is not determined (No in Step S43), the determination processing in Step S42 is performed again.

When the pack is determined (Yes in Step S43), the queue managing unit 67 notifies the MPU 50 of a pack completion notification (Step S44) and waits for a release request from the MPU 50 (Step S45). When a release request is received from the MPU 50 (Yes in Step S45), the queue managing unit 67 generates a clear signal for deleting reference data relating to the pack (Step S46). Then, the Valid signal of the pack becomes invalid (Step S47) and the processing moves to the processing in Step S41.

FIG. 17B is a flowchart explaining an operation of managing progress of input of commands relating to each pack. First, the queue managing unit 67 determines whether a pack is designated as an input target by the execution managing unit 68 for one pack (Step S51). When the pack is not designated as an input target (No in Step S51), the determination processing in Step S51 is repeatedly performed. When the pack is designated as an input target (Yes in Step S51), the queue managing unit 67 determines whether the number of input entries of the pack matches the number of entries described in reference data (Step S52).

When the number of input entries matches the number of entries described in reference data (Yes in Step S52), the queue managing unit 67 determines whether the pack is determined (Step S53). This determination processing is performed because a generated entry can be input to the command buffer 65 even when not all of entries for one pack have not been generated. When the number of input entries does not match the number of entries described in reference data (No in Step S52) or when the pack is not determined (No in Step S53), the determination processing in Step S52 is performed again.

When the pack is determined (Yes in Step S53), the queue managing unit 67 notifies the execution managing unit 68 of a signal indicating that input of the pack is completed (Step S54). When the execution managing unit 68 receives the signal, the execution managing unit 68 can designate the next pack as an input target, and, when the next pack is designated as an input target, the input managing unit 64 can input it without waiting for execution completion of the last pack.

After the processing in Step S54, the queue managing unit 67 determines whether a clear signal relating to the pack is received (Step S55). When a clear signal is not received (No in Step S55), the processing in Step S55 is performed again. When a clear signal is received (Yes in Step S55), the queue managing unit 67 deletes reference data relating to the pack (Step S56) and moves to the processing in Step S51.

FIG. 17C is a flowchart explaining an operation of designating a pack as an input target by the execution managing unit 68. As shown in FIG. 17C, first, the execution managing unit 68 checks whether there is a valid entry for all packs (Step S61). Presence or absence of a valid entry can be checked by referring to the Valid signal for each pack. When there is no valid entry (No in Step S61), the processing in Step S61 is performed until a valid entry is found.

When there is a valid entry (Yes in Step S61), the execution managing unit 68 checks whether input of a pack, which is currently designated as an input target, to the command buffer 65 is completed (Step S62). It is possible to check whether or not input of a command for the pack as an input target is completed based on whether a signal issued by processing in Step S54 is received by the queue managing unit 67. When input of the pack as an input target is not completed (No in Step S62), the processing in Step S62 is performed until completing input.

When input of the pack as an input target is completed (Yes in Step S62), the execution managing unit 68 newly designates one of packs having a valid entry checked in Step S61 as an input target (Step S63) and moves to the processing in Step S61.

FIG. 18 is a flowchart explaining a switching operation of a queue by the queue managing unit 67. The queue managing unit 67 first selects the normal queue 62 by a selection signal (Step S71) and determines whether there is reference data in the priority queue 61 (Step S72). When there is no reference data registered in the priority queue 61 (No in Step S72), the processing moves to Step S71 and the normal queue 62 remains selected by a selection signal.

When there is reference data registered in the priority queue 61 (Yes in Step S72), the queue managing unit 67 transmits a stop request notification to the NANDC control unit 66 and the input managing unit 64 (Step S73). When the input managing unit 64 receives the stop request notification, the input managing unit 64 stops the operation. After transmitting the stop request notification, the queue managing unit 67 determines whether a stop enable notification is received from the NANDC control unit 66 (Step S74). When a stop enable notification is not received (No in Step S74), the queue managing unit 67 repeats the determination processing in Step S74 until receiving a stop enable notification.

When a stop enable notification is received (Yes in Step S74), the queue managing unit 67 determines whether the value of the post-processing flag of reference data designated as an input target of the normal queue 62 is "1" indicating that the post-processing is needed (Step S75). When the value of the post-processing flag is "1" (Yes in Step S75), the queue managing unit 67 flushes the command buffer 65 (Step S76) and instructs the input managing unit 64 to store the post-processing descriptor 37 in the command buffer 65 (Step S77). Then, the queue managing unit 67 transmits an operation resume notification to the NANDC control unit 66 and the input managing unit 64 (Step S78). Then, the NANDC control unit 66 and the input managing unit 64 resume the operation and perform input of the post-processing descriptor 37 stored in the command buffer 65 to the NANDC 20.

When the queue managing unit 67 confirms execution completion of a command relating to the post-processing descriptor 37 (Step S79), the queue managing unit 67 transmits a stop request notification to the NANDC control unit 66 and the input managing unit 64 (Step S80). Execution completion of a command relating to the post-processing descriptor 37 can be confirmed by monitoring an execution completion notification. After transmitting a stop request notification, when the queue managing unit 67 receives a stop enable notification from the NANDC control unit 66 (Step S81), the queue managing unit 67 flushes the command buffer 65 (Step S82), switches a selection signal from the normal queue 62 to the priority queue 61, and transmits an operation resume notification to the NANDC control unit 66 and the input managing unit 64 (Step S84).

In the determination processing in Step S75, when the value of the post-processing is not "1" (No in Step S75), the processing in Step S76 to Step S82 is skipped.

After the processing in Step S84, data transfer relating to reference data registered in the priority queue 61 is performed by an operation explained with reference to FIG. 15 and FIG. 16. When data transfer relating to the reference data is all completed, the reference data is deleted from the priority queue 61 by an operation explained with reference to FIG. 17B.

The queue managing unit 67 determines whether execution of the priority queue 61 is all completed (Step S85), and, in the case of incompletion (No in Step S85), the determination processing in Step S85 is performed again. When execution of the priority queue 61 is all completed (Yes in Step S85), the queue managing unit 67 instructs the input managing unit 64 to store the pre-processing descriptor 38 in the command buffer 65 (Step S86). Then, the queue managing unit 67 transmits an operation resume notification to the NANDC control unit 66 and the input managing unit 64 (Step S87). Then, the NANDC control unit 66 and the input managing unit 64 resume the operation and perform input of the execution managing unit 68 stored in the command buffer 65 to the NANDC 20.

When the queue managing unit 67 confirms execution completion of a command relating to the post-processing descriptor 37 (Step S88), the queue managing unit 67 switches a selection signal from the priority queue 61 to the normal queue 62 (Step S89) and instructs the input managing unit 64 to store an unexecuted entry in an entry group relating to reference data designated as an input target of the normal queue 62 in the command buffer 65 (Step S90). Thereafter, the queue managing unit 67 transmits an operation resume notification to the NANDC control unit 66 and the input managing unit 64 (Step S91) and performs the processing in Step S71.

In the explanation in FIG. 18, after completing execution of the priority queue 61, a queue as an execution target is switched to the normal queue 62 even if a pack is not registered in the normal queue 62, however, the configuration may be such that after completing execution of the priority queue 61, a queue as an execution target is switched when a pack is registered in the normal queue 62.

The memory chip 21 includes one in which the memory cell array 24 is divided into a plurality of regions called planes each including a plurality of physical blocks. Each plane includes an independent peripheral circuit (including the data cache 22 and the page buffer 23) and can perform high-speed access compared with a case of performing access to one plane by performing reading/writing/erasing on a plurality of planes at the same time.

FIG. 19 is a diagram illustrating a specific example of a data structure of the NANDC descriptor 36 for performing the continuous write processing for two pages on two planes included in the memory chip 21. The two planes included in the memory chip 21 are described as a plane 0 and a plane 1, respectively, to distinguish therebetween.

According to the example in FIG. 19, the NANDC descriptor 36 is configured to include an entry in which the reset command (FFh) is described, a set of an entry in which a write command for the plane 0 is described, an entry in which a write command for the plane 1 is described, and an entry in which the status read command (71h) is described, for two pages, and an entry in which the status polling command (71h) is described from the upper stage. In this manner, when the continuous write processing is performed on two planes, the command 71h, which is different from the command 70h when performing the continuous write processing on one plane, is employed as the status read command (and the status polling command).

FIG. 20 is a diagram illustrating a specific example of a data structure of the post-processing descriptor 37 used when performing the continuous write processing on two planes. As shown in FIG. 20, this post-processing descriptor 37 is composed of an entry in which the status polling command (71h) is described.

In this manner, when there is a plurality of types of status polling commands executed in the continuous write processing, the post-processing descriptor 37 may be prepared for each type of the status polling commands and the type of the status polling command may be specified by the post-processing flag added to reference data.

Moreover, in the above explanation, in the case of performing data transfer relating to the normal queue 62, when a queue is switched between the priority queue 61 and the normal queue 62, a reset command is always executed as the pre-processing, however, reference data may include a flag indicating whether the pre-processing is needed and the queue managing unit 67 may or may not perform the pre-processing based on the flag.

Moreover, in the above explanation, the entity of a command is described in a descriptor and reference data for referring to the descriptor is registered in each queue, however, data, in which a command for each pack is described, may be registered in each queue.

In this manner, according to the first embodiment of the present invention, the configuration is such that the transfer preparing unit 42 generates a command for reading out data, for which a read request is issued from the host apparatus 100, from the NAND memory 2 and registers the generated command in the priority queue 61, and the MPU 50 generates a command for causing the NAND memory 2 to perform data transfer relating to internal processing and registers the generated command in the normal queue 62, and the queue selecting unit 63, the input managing unit 64, the command buffer 65, the NANDC control unit 66, the queue managing unit 67, and the NANDC 20 functioning as the nonvolatile memory managing unit by cooperating with each other read out reference data registered in the priority queue 61 in priority to reference data registered in the normal queue 62 and transmit a command corresponding to the read out reference data to the NAND memory 2, so that data transfer relating to a read request from the host apparatus 100 can be performed in priority to data transfer relating to internal processing, enabling to efficiently respond to a read request from the host apparatus 100.

Moreover, the configuration is such that the MPU 50 adds the continuous input instruction flag (continuous execution information) indicating whether the next command needs to be continuously executed to a descriptor, and, when a command is registered in the priority queue 61 while executing a command registered in the normal queue 62, the nonvolatile memory managing unit determines the switching timing of a queue of a read source of the command based on the continuous input instruction flag added to the command in execution, so that the status polling can be automatically inserted as the post-processing when switching a queue during execution of the continuous write processing, enabling to prevent occurrence of a program error at the time of switching.

Moreover, the configuration is such that the transfer preparing unit 42 composes a pack of continuously generated one or more command and adds the post-processing flag (interrupt processing information) indicating whether insertion of the post-processing is needed at the time of interruption to reference data for each pack, and the nonvolatile memory managing unit selects whether to insert the post-processing based on the post-processing flag when switching a queue from the normal queue 62 to the priority queue 61, so that it is possible to insert or not to insert the post-processing for each type of processing.

Moreover, the nonvolatile memory managing unit is configured to transmit a command for causing to perform the pre-processing to the NAND memory 2 when switching a read source of a command to be transmitted to the NAND memory 2 from the priority queue 61 to the normal queue 62, so that a reset command as the pre-processing can be inserted when the continuous read processing is resumed, enabling to resume the interrupted continuous read processing not from the beginning of the continuous read processing but from the interrupted part.

In the above explanation, in order to improve efficiency of data transfer with the host apparatus 100, the automatic-transfer managing unit 40 performs control relating to data transfer based on a request from the host apparatus 100 instead of the MPU 50 to concentrate a calculator cost of the MPU 50 in internal processing. However, part or all of the components of the automatic-transfer managing unit 40 may be realized as any of hardware and software or a combination thereof. When the components of the automatic-transfer managing unit 40 are realized by hardware, it is possible to obtain an effect that the components inside or inside and outside the automatic-transfer managing unit 40 can be easily synchronized by using a notification signal (execution completion notification, stop request notification, stop enable notification, operation resume notification, and the like) becomes simple.

Figure 21:
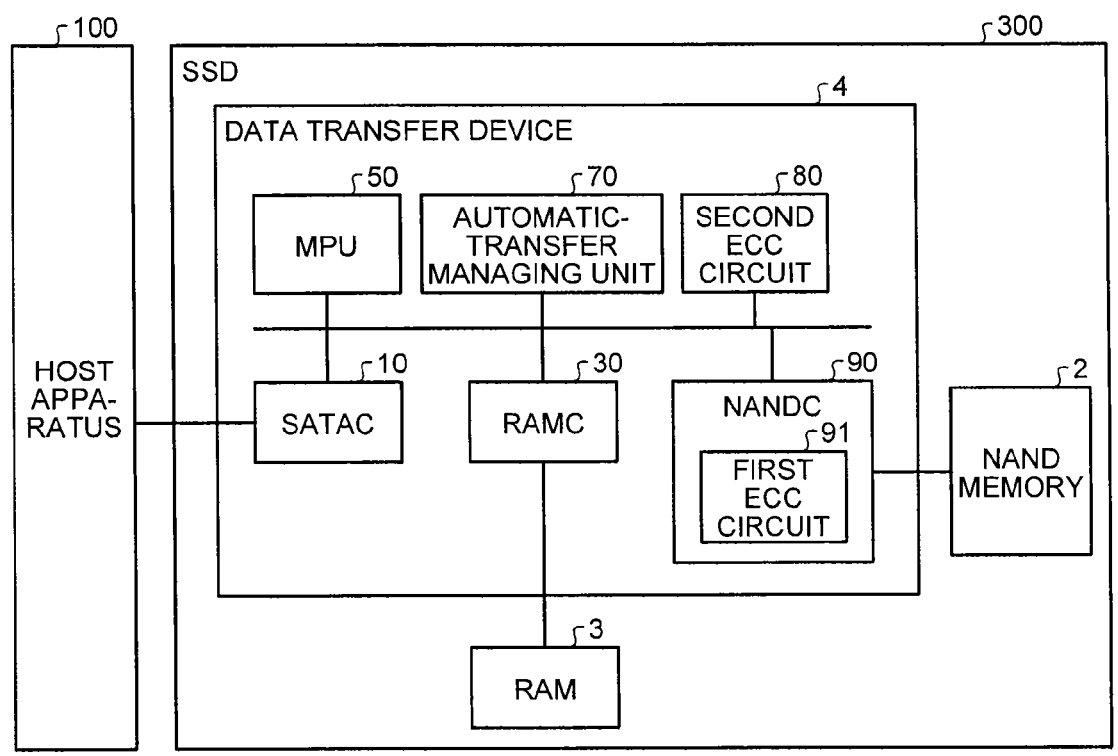
FIG. 21 is a diagram explaining a configuration of an SSD to which a memory system in a second embodiment is applied.

FIG. 21 is a diagram explaining a configuration of an SSD to which a memory system in a second embodiment is applied. In the explanation of the second embodiment, components same as those in the first embodiment are denoted by the same reference numerals and overlapping explanation is omitted.

As shown in FIG. 21, an SSD 300 in the second embodiment includes a data transfer device 4, the NAND memory 2, and the RAM 3. The data transfer device 4 includes the SATAC 10, the RAMC 30, the MPU 50, an automatic-transfer managing unit 70, a second ECC (Error Checking and Correction) circuit 80, and a NANDC 90 including a first ECC circuit. The SATAC 10, the RAMC 30, the MPU 50, the automatic-transfer managing unit 70, the second ECC circuit 80, and the NANDC 90 are connected with each other by a bus.

A first ECC circuit 91 performs encoding and decoding of a first error correction code and performs encoding of a second error correction code. The second ECC circuit 80 performs decoding of the first error correction code.

The first error correction code and the second error correction code are, for example, a hamming code, a BCH (Bose Chaudhuri Hocquenghem) code, a RS (Reed Solomon) code, a LDPC (Low Density Parity Check) code, or the like, and the correction capability of the second error correction code is higher than the correction capability of the first error correction code. The first ECC circuit 91, for example, performs encoding on data of physical page unit. The second ECC circuit 80, for example, performs encoding on data written over a plurality of banks. When performing read processing, the NANDC 90 performs error correction by the first ECC circuit 91. Then, when error correction by the first ECC circuit 91 fails, error correction by the second ECC circuit 80 is performed under the control of the MPU 50.

Processing of correcting an error performed when error correction by the first ECC circuit 91 fails is described as error processing. The error processing is not limited to error correction by the second ECC circuit 80 described above. For example, as the error processing, reading may be performed by changing a read voltage of the memory chip 21 configuring the NAND memory 2. Moreover, the NANDC 90 may perform error detection and, when an error is detected, perform the error processing. Furthermore, the NANDC 90 may be configured to be capable of detecting a program error at the time of writing and, when a program error is detected, perform the error processing of, for example, attempting to perform writing after changing a write position.

Figure 22:
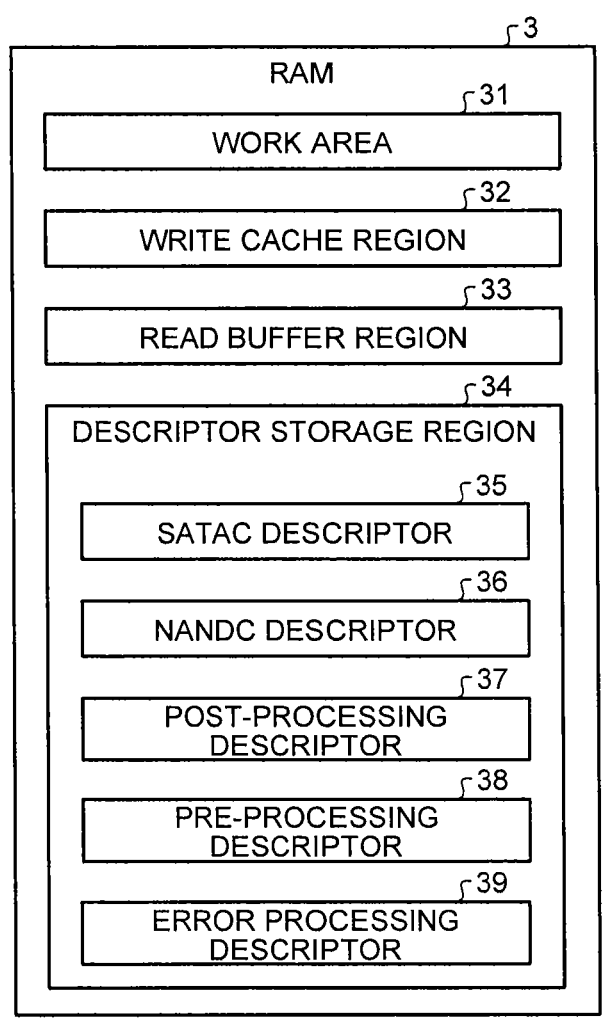
FIG. 22 is a diagram explaining a memory structure of a RAM.

FIG. 22 is a diagram explaining a memory structure of the RAM 3. As shown in FIG. 22, the RAM 3 includes the work area 31, the write cache region 32, the read buffer region 33, and the descriptor storage region 34. In the descriptor storage region 34, the SATAC descriptor 35, the NANDC descriptor 36, the post-processing descriptor 37, the pre-processing descriptor 38, and an error processing descriptor 39 are stored. The error processing descriptor 39 is data in which an entity of a command transmitted to the NAND memory 2 for realizing the error processing is described and is generated by the MPU 50. When the MPU 50 generates the error processing descriptor 39, the MPU 50 generates reference data for referring to the error processing descriptor 39 and registers the generated reference data in an error queue 72 to be described later.

Figure 23:
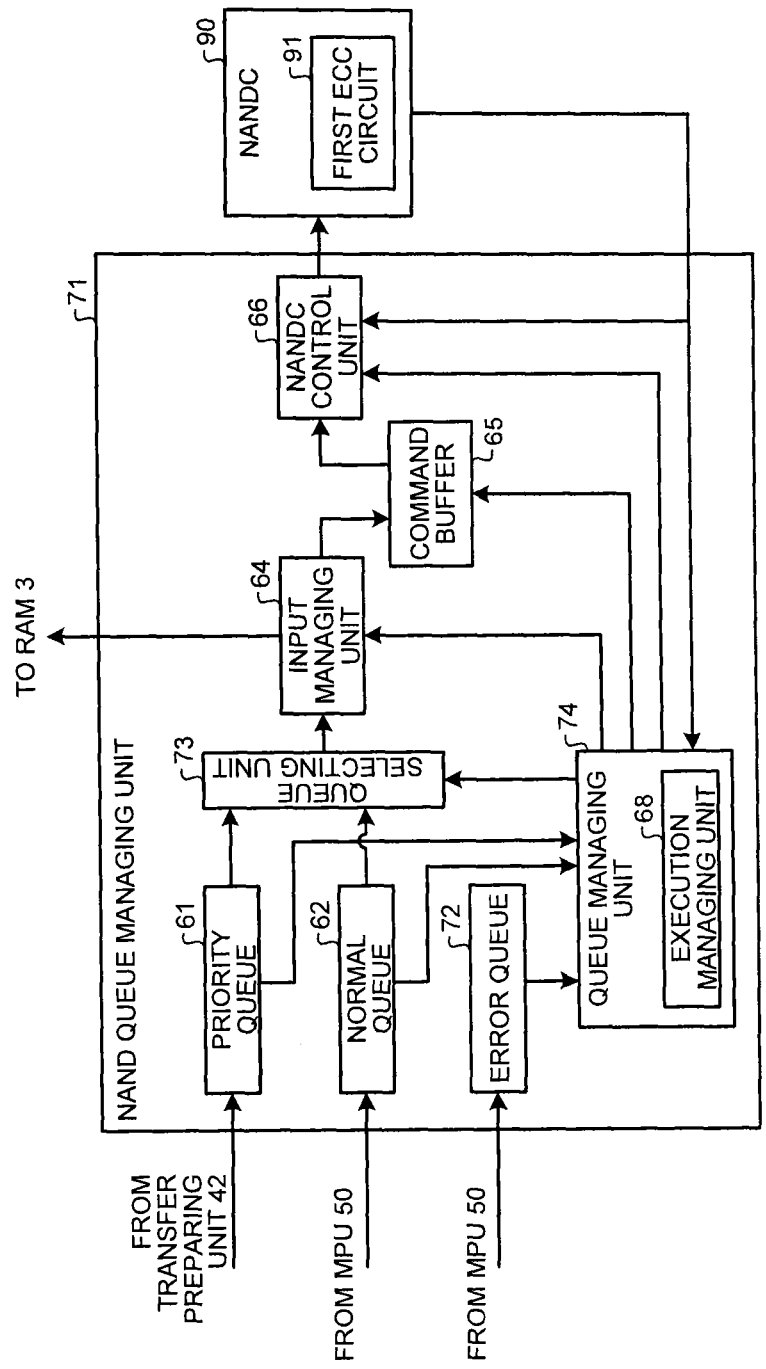
FIG. 23 is a diagram explaining an internal configuration of a NAND queue managing unit in the second embodiment.

The configuration of the automatic-transfer managing unit 70 is the same as the first embodiment except the configuration of the NAND queue managing unit, so that only the configuration of the NAND queue managing unit is explained here for the automatic-transfer managing unit 70. FIG. 23 explains an internal structure of the NAND queue managing unit in the second embodiment. As shown in FIG. 23, a NAND queue managing unit 71 includes the priority queue 61, the normal queue 62, the error queue 72, a queue selecting unit 73, the input managing unit 64, the command buffer 65, the NANDC control unit 66, and a queue managing unit 74.

Reference data relating to the error processing is registered in the error queue 72 from the MPU 50. The queue selecting unit 73 selects a queue of a read source of the reference data by the input managing unit 64 from among the priority queue 61, the normal queue 62, and the error queue 72 based on a selection signal from the queue managing unit 74.

When the NANDC 90 receives an error occurrence notification indicating that error correction by the first ECC circuit 91 fails, the queue managing unit 74 transmits a stop command notification to the NANDC control unit 66 to stop operations of the input managing unit 64 and the NANDC control unit 66 and flushes the command buffer 65. Then, when reference data is registered in the error queue 72 from the MPU 50, a selection signal is switched to the error queue 72 and operations of the input managing unit 64 and the NANDC control unit 66 are resumed.

Figure 24:
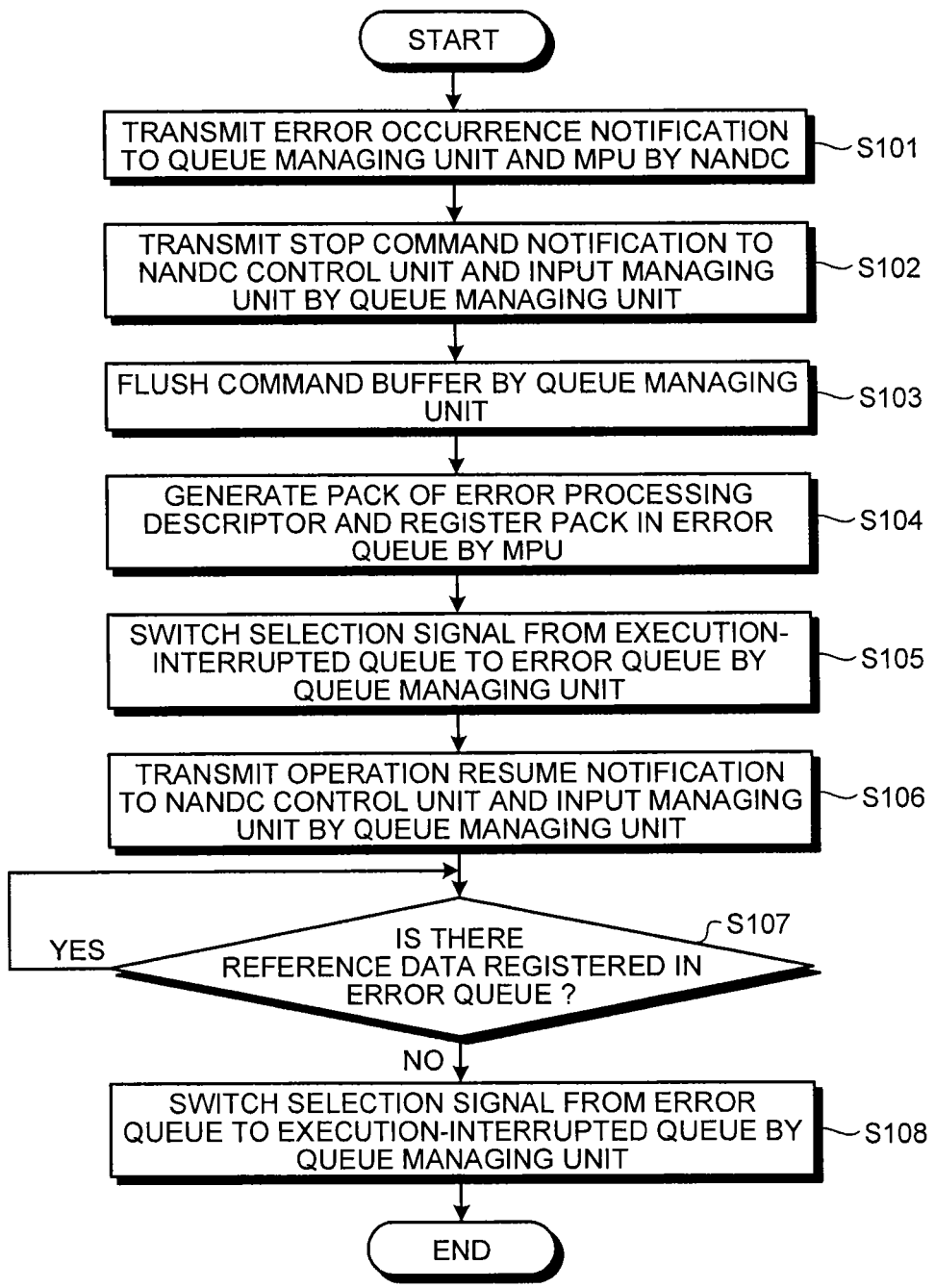
FIG. 24 is a flowchart explaining an operation relating to error processing of the SSD in the second embodiment.

FIG. 24 is a flowchart explaining an operation relating to the error processing of the SSD 300 in the second embodiment. When error correction by the first ECC circuit 91 fails, the NANDC 90 transmits an error occurrence notification to the queue managing unit 74 and the MPU 50 (Step S101). Then, the queue managing unit 74 transmits a stop command notification to the NANDC control unit 66 and the input managing unit 64 to stop operations of the NANDC control unit 66 and the input managing unit 64 (Step S102) and flushes the command buffer 65 (Step S103).

On the other hand, the MPU 50 that receives an error occurrence notification analyzes a failure cause by accessing the NANDC 90, and generates the error processing descriptor 39 based on the analysis result and registers reference data for referring to the generated error processing descriptor 39 in the error queue 72 (Step S104). In this embodiment, reference data is registered for every plurality of entries (pack).

When the reference data is registered in the error queue 72, the queue managing unit 74 switches a selection signal to the error queue (Step S105) and transmits an operation resume notification to the input managing unit 64 and the NANDC control unit 66 (Step S106). Consequently, the error processing is performed based on the reference data registered in the error queue 72. The queue managing unit 74 deletes executed reference data from the queue managing unit 74 by performing an operation explained in FIG. 17B.

The queue managing unit 74 determines whether there is reference data in the error queue 72 (Step S107) and, when reference data remains (Yes in Step S107), performs the determination processing in Step S107 again. When there is no reference data in the error queue 72 (No in Step S107), the queue managing unit 74 switches a selection signal from the error queue 72 to an interrupted original queue (Step S108) and an operation at the time of the error processing is completed.

In this manner, according to the second embodiment of the present invention, the configuration is such that the first ECC circuit 91, which detects an error correction error, is included in the configuration of the first embodiment, and when the first ECC circuit 91 detects an error correction error, the MPU 50 generates a command for the NAND memory 2 relating to the error processing corresponding to the detected error correction error and registers the generated command in the error queue 72, and the queue selecting unit 73, the input managing unit 64, the command buffer 65, the NANDC control unit 66, the queue managing unit 74, and the NANDC 90 functioning as the nonvolatile memory managing unit by cooperating with each other switch a read source of the command from the priority queue 61 or the normal queue 62 to the error queue 72 when the command is registered in the error queue 72, so that it becomes possible to perform the error processing in addition to the effect obtained in the first embodiment.

Figure 25:
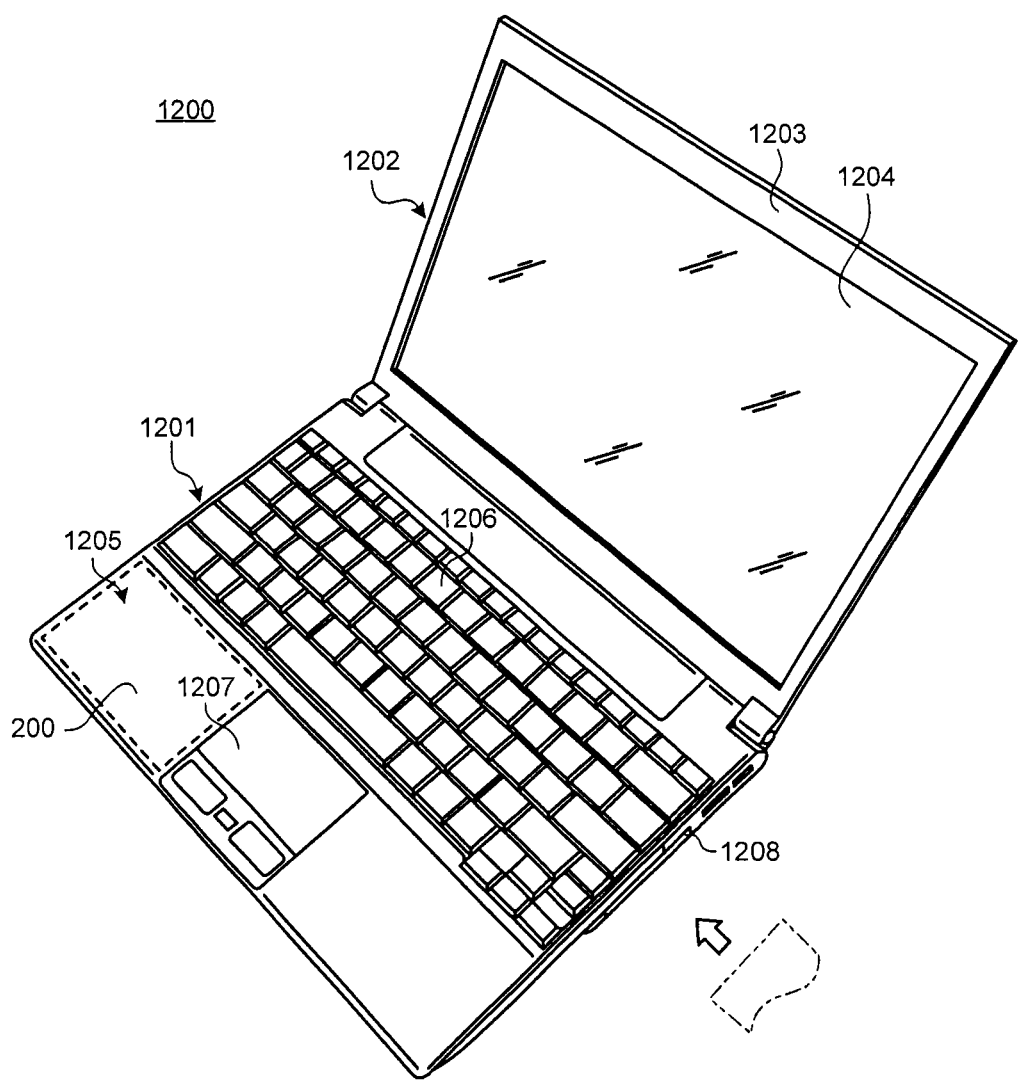
FIG. 25 is a perspective view illustrating an example of a personal computer on which the SSD in the first embodiment is mounted.

FIG. 25 is a perspective view illustrating an example of a personal computer 1200 on which the SSD 200 in the first embodiment is mounted. The SSD 300 in the second embodiment can be mounted on this personal computer 1200 instead of the SSD 200 in the first embodiment.

The personal computer 1200 includes a main body 1201 and a display unit 1202. The display unit 1202 includes a display housing 1203 and a display device 1204 accommodated in the display housing 1203.

The main body 1201 includes a chassis 1205, a keyboard 1206, and a touch pad 1207 as a pointing device. The chassis 1205 includes therein a main circuit board, an ODD (Optical Disk Device) unit, a card slot, the SSD 200, and the like.

The card slot is provided so as to be adjacent to the peripheral wall of the chassis 1205. The peripheral wall has an opening 1208 facing the card slot. A user can insert and remove an additional device into and from the card slot from outside the chassis 1205 through the opening 1208.

The SSD 200 may be used instead of a conventional HDD in the state of being mounted on the personal computer 1200 or may be used as an additional device in the state of being inserted into the card slot included in the personal computer 1200.

Figure 26:
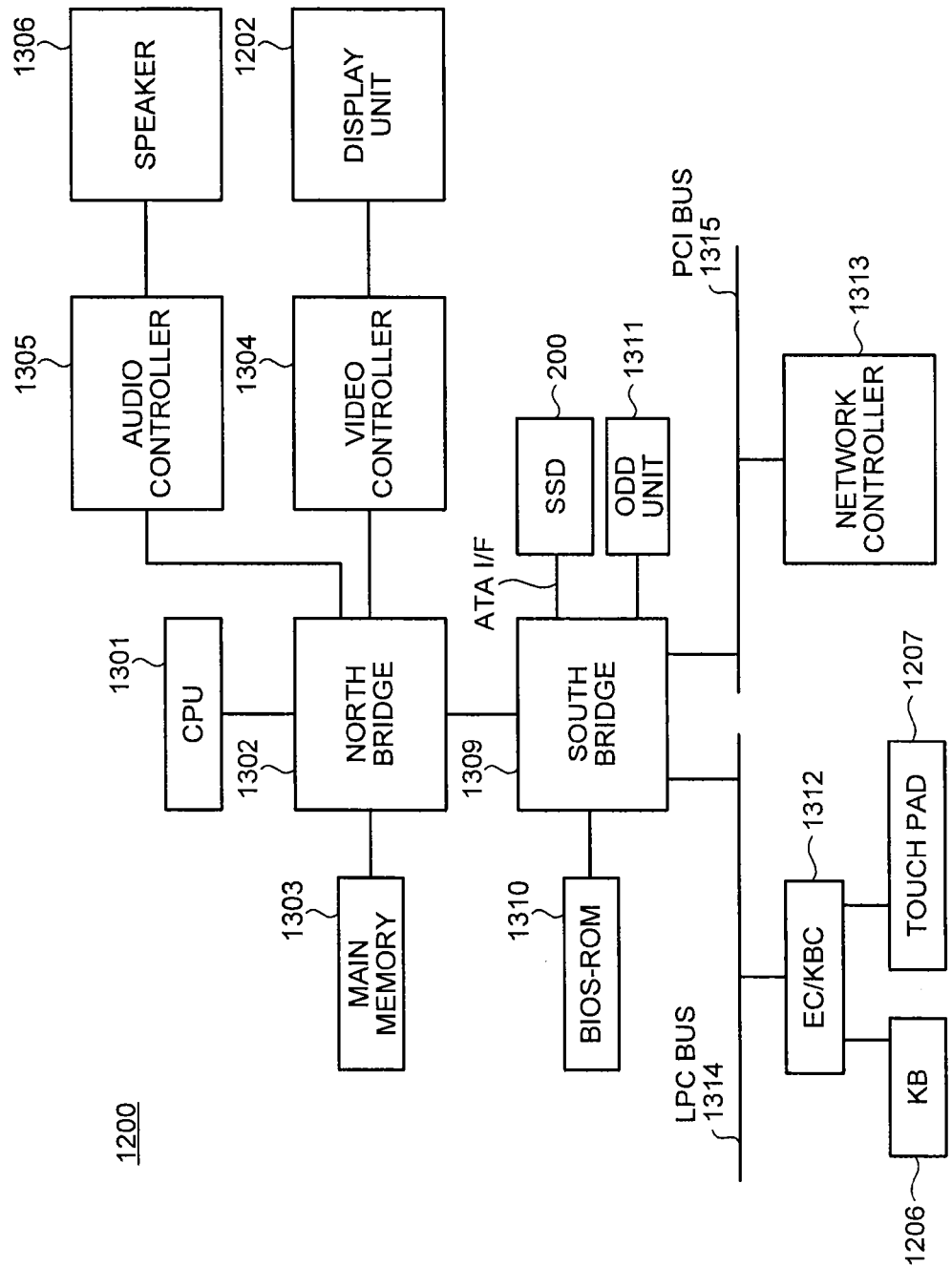
FIG. 26 is a diagram explaining a system configuration example of the personal computer on which the SSD in the first embodiment is mounted.

FIG. 26 illustrates a system configuration example of a personal computer on which the SSD 200 is mounted. The personal computer 1200 includes a CPU 1301, a north bridge 1302, a main memory 1303, a video controller 1304, an audio controller 1305, a south bridge 1309, a BIOS-ROM 1310, the SSD 200, an ODD unit 1311, an embedded controller/keyboard controller IC (EC/KBC) 1312, a network controller 1313, and the like.

The CPU 1301 is a processor provided for controlling an operation of the personal computer 1200, and executes an operating system (OS) loaded from the SSD 200 onto the main memory 1303. Furthermore, when the ODD unit 1311 is capable of executing at least one of read processing and write processing on a mounted optical disk, the CPU 1301 executes the processing.

Moreover, the CPU 1301 executes a system BIOS (Basic Input Output System) stored in the BIOS-ROM 1310. The system BIOS is a program for controlling a hardware in the personal computer 1200.

The north bridge 1302 is a bridge device that connects a local bus of the CPU 1301 to the south bridge 1309. A memory controller for performing access control of the main memory 1303 is built in the north bridge 1302.

Moreover, the north bridge 1302 has a function of executing communication with the video controller 1304 and communication with the audio controller 1305 through an AGP (Accelerated Graphics Port) bus and the like.

The main memory 1303 temporarily stores therein a program and data and functions as a work area of the CPU 1301. The main memory 1303, for example, consists of a RAM.

The video controller 1304 is a video reproduction controller for controlling the display unit 1202 used as a display monitor of the personal computer 1200.

The audio controller 1305 is an audio reproduction controller for controlling a speaker 1306 of the personal computer 1200.

The south bridge 1309 controls each device on a LPC (Low Pin Count) bus 1314 and each device on a PCI (Peripheral Component Interconnect) bus 1315. Moreover, the south bridge 1309 controls the SSD 200, which is a memory device storing various types of software and data, through the SATA interface.

The personal computer 1200 accesses the SSD 200 in sector units. A write command, a read command, a flush command, and the like are input to the SSD 200 through the SATA interface.

The south bridge 1309 has a function of performing access control of the BIOS-ROM 1310 and the ODD unit 1311.

The EC/KBC 1312 is a one-chip microcomputer in which an embedded controller for power management and a keyboard controller for controlling the keyboard (KB) 1206 and the touch pad 1207 are integrated.

This EC/KBC 1312 has a function of turning on/off the power of the personal computer 1200 according to an operation of a power button by a user. The network controller 1313 is, for example, a communication device that executes communication with an external network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
    a nonvolatile memory;
    a temporary memory; and
    a data transfer device configured to perform data transfer between a host apparatus and the nonvolatile memory by using the temporary memory as a buffer, wherein
    the data transfer device includes
        a first command generator configured to generate a first command for reading out data, for which a read request is issued from the host apparatus, from the nonvolatile memory,
        a second command generator configured to generate a second command for internal processing of the memory system associated with the temporary memory and the nonvolatile memory,
        a first memory having a queue structure and configured to store the first command,
        a second memory having a queue structure and configured to store the second command, and
        a memory manager configured to read out the first command stored in the first memory in priority to the second command stored in the second memory and to transmit a read-out command to the nonvolatile memory, wherein
    the second command generator is configured to associate continuous execution information indicating whether a following command needs to be continuously executed with each of the second commands, and
    the memory manager is configured to, in a case where the first command is stored in the first memory while the second command stored in the second memory is transmitted to the memory manager, determine timing of queue switching from the second memory to the first memory based on the continuous execution information.

2. The memory system according to claim 1, wherein the internal processing includes processing of writing data, which is buffered in the temporary memory and for which a write request is issued from the host apparatus, in the nonvolatile memory.

3. The memory system according to claim 1, wherein the internal processing includes processing of organizing data stored in the nonvolatile memory with the temporary memory as a work area.

4. The memory system according to claim 1, wherein the internal processing includes processing of loading an address translation table in the temporary memory and processing of storing an address translation table loaded in the temporary memory in the nonvolatile memory, the address translation table associating a logical address, with which a read/write request is issued from the host apparatus, with a physical address of the nonvolatile memory.

5. The memory system according to claim 1, wherein
    the second command generator is configured to associate a pack including continuously generated one or more second command with interrupt processing information indicating whether predetermined post-processing needs to be performed when interrupting continuous execution of commands included in the pack, and
    in a case of queue switching from the second memory to the first memory, when the interrupt processing information is associated with the pack in which continuous execution is interrupted by the switching, the memory manager is configured to transmit the second command for performing the post-processing before transmitting the first command stored in the first memory.

6. The memory system according to claim 2, wherein
    the second command generator is configured to associate a pack including continuously generated one or more second command with interrupt processing information indicating whether predetermined post-processing needs to be performed when interrupting continuous execution of commands included in the pack, and
    in a case of queue switching from the second memory to the first memory, when the interrupt processing information is associated with the pack in which continuous execution is interrupted by the switching, the memory manager is configured to transmit the second command for performing the post-processing before transmitting the first command stored in the first memory.

7. The memory system according to claim 3, wherein
the second command generator is configured to associate a pack including continuously generated one or more second command with interrupt processing information indicating whether predetermined post-processing needs to be performed when interrupting continuous execution of commands included in the pack, and
in a case of queue switching from the second memory to the first memory, when the interrupt processing information is associated with the pack in which continuous execution is interrupted by the switching, the memory manager is configured to transmit the second command for performing the post-processing before transmitting the first command stored in the first memory.

8. The memory system according to claim 4, wherein
the second command generator is configured to associate a pack including continuously generated one or more second command with interrupt processing information indicating whether predetermined post-processing needs to be performed when interrupting continuous execution of commands included in the pack, and
in a case of queue switching from the second memory to the first memory, when the interrupt processing information is associated with the pack in which continuous execution is interrupted by the switching, the memory manager is configured to transmit the second command for performing the post-processing before transmitting the first command stored in the first memory.

9. The memory system according to claim 5, wherein the memory manager is configured to, after completing execution of all first commands stored in the first memory, switch queuing source from the first memory to the second memory.

10. The memory system according to claim 9, wherein the memory manager is configured to, when switching the queuing source from the first memory to the second memory, transmit the second command for performing predetermined pre-processing to the nonvolatile memory.

11. A memory system comprising:
a nonvolatile memory;
a temporary memory; and
a data transfer device configured to perform data transfer between a host apparatus and the nonvolatile memory by using the temporary memory as a buffer, wherein
the data transfer device includes
    a first command generator configured to generate a first command for reading out data, for which a read request is issued from the host apparatus, from the nonvolatile memory,
    a second command generator configured to generate a second command for internal processing of the memory system associated with the temporary memory and the nonvolatile memory,
    a first memory having a queue structure and configured to store the first command,
    a second memory having a queue structure and configured to store the second command, and
    a memory manager configured to read out the first command stored in the first memory in priority to the second command stored in the second memory and to transmit a read-out command to the nonvolatile memory,
wherein
the data transfer device further includes
    an execution error detector configured to detect an execution error of a command transmitted to the nonvolatile memory,
    a third command generator configured to, when the execution error detector detects the execution error, generate a third command for the nonvolatile memory relating to error processing corresponding to the detected execution error, and
    a third memory having a queue structure and configured to store the third command, and
the memory manager is configured to, when the third command is stored in the third memory, switch the queuing source from the first memory or the second memory to the third memory.

12. The memory system according to claim 11, wherein the internal processing includes at least one of write processing and read processing to the nonvolatile memory relating to the error processing.

13. The memory system according to claim 11, wherein the internal processing includes processing of writing data, which is buffered in the temporary memory and for which a write request is issued from the host apparatus, in the nonvolatile memory.

14. The memory system according to claim 11, wherein the internal processing includes processing of organizing data stored in the nonvolatile memory with the temporary memory as a work area.

15. The memory system according to claim 11, wherein the internal processing includes processing of loading an address translation table in the temporary memory and processing of storing an address translation table loaded in the temporary memory in the nonvolatile memory, the address translation table associating a logical address, with which a read/write request is issued from the host apparatus, with a physical address of the nonvolatile memory.

16. A memory system comprising:
a memory;
a first command generator configured to issue a first command;
a second command generator configured to issue a plurality of second commands, each second command including a flag information; and
a manager configured to send each second command sequentially to the memory, and determine timing of sending the first command to the memory based on the flag information included in each second command when the first command is issued while executing sending of each second command.

* * * * *